US012757119B2

(12) United States Patent
Landis et al.

(10) Patent No.: US 12,757,119 B2
(45) Date of Patent: Oct. 6, 2026

(54) TECHNIQUES FOR REDUCING POWER CONSUMPTION IN USER EQUIPMENT MODEMS

(71) Applicant: QUALCOMM Incorporated, San Diego, CA (US)

(72) Inventors: Shay Landis, Hod Hasharon (IL); Jacob Pick, Mevaseret Zion (IL); Tomer Geva, Kiryat Ono (IL); Peer Berger, Hod Hasharon (IL)

(73) Assignee: QUALCOMM Incorporated, San Diego, CA (US)

( * ) Notice: Subject to any disclaimer, the term of this patent is extended or adjusted under 35 U.S.C. 154(b) by 566 days.

(21) Appl. No.: 18/321,522

(22) Filed: May 22, 2023

(65) Prior Publication Data

US 2024/0397428 A1 Nov. 28, 2024

(51) Int. Cl.
*H04W 52/02* (2009.01)

(52) U.S. Cl.
CPC ... *H04W 52/0248* (2013.01); *H04W 52/0245* (2013.01)

(58) Field of Classification Search
CPC ...................... H04W 52/0245; H04W 52/0248
See application file for complete search history.

(56) References Cited

U.S. PATENT DOCUMENTS 6,256,476 B1 * 7/2001 Beamish ............. H04W 52/283 455/574
6,865,168 B1 * 3/2005 Sekine .................. H04W 52/42 370/335
2008/0298474 A1 * 12/2008 Charbit ................ H04B 7/2606 375/241
2012/0036410 A1 * 2/2012 Rault ................ H03M 13/6544 714/752
2013/0243062 A1 * 9/2013 Raju ................... H04L 27/2647 375/226
2021/0377092 A1 * 12/2021 Zach ..................... H04W 72/21

FOREIGN PATENT DOCUMENTS

CN 1322767 C * 6/2007

OTHER PUBLICATIONS

CN-1322767-C English Translation (Year: 2007).*

* cited by examiner

*Primary Examiner* — James P Duffy
(74) *Attorney, Agent, or Firm* — Harrity & Harrity, LLP

(57) ABSTRACT

Various aspects of the present disclosure generally relate to wireless communication. In some aspects, a user equipment (UE) may determine that a measurement associated with signal strength satisfies a threshold. The UE may modify a parameter associated with a modem of the UE, based at least in part on the measurement satisfying the threshold, to reduce power consumption. Numerous other aspects are described.

28 Claims, 10 Drawing Sheets

TECHNIQUES FOR REDUCING POWER CONSUMPTION IN USER EQUIPMENT MODEMS

FIELD OF THE DISCLOSURE

Aspects of the present disclosure generally relate to wireless communication and to techniques and apparatuses for reducing power consumption in user equipment modems.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth, transmit power, etc.). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

These multiple access technologies have been adopted in various telecommunication standards to provide a common protocol that enables different UEs to communicate on a municipal, national, regional, or global level. New Radio (NR), which also may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency-division multiplexing (OFDM) with a cyclic prefix (CP) (CP-OFDM) on the downlink, using CP-OFDM or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation.

SUMMARY

Some aspects described herein relate to an apparatus for wireless communication at a user equipment (UE). The apparatus may include a memory and one or more processors coupled to the memory. The one or more processors may be configured to determine that a measurement associated with signal strength satisfies a threshold. The one or more processors may be configured to modify a parameter associated with a modem of the UE, based at least in part on the measurement satisfying the threshold, to reduce power consumption.

Some aspects described herein relate to an apparatus for wireless communication at a UE. The apparatus may include a memory and one or more processors coupled to the memory. The one or more processors may be configured to transmit an indication that the UE is configured to use spare signal-to-noise ratio (SNR) to reduce power consumption. The one or more processors may be configured to modify a parameter associated with a modem of the UE based at least in part on the spare SNR satisfying a threshold.

Some aspects described herein relate to an apparatus for wireless communication at a network node. The apparatus may include a memory and one or more processors coupled to the memory. The one or more processors may be configured to receive an indication that a UE is configured to use spare SNR to reduce power consumption. The one or more processors may be configured to transmit at least one parameter associated with using the spare SNR to reduce power consumption.

Some aspects described herein relate to a method of wireless communication performed by a UE. The method may include determining that a measurement associated with signal strength satisfies a threshold. The method may include modifying a parameter associated with a modem of the UE, based at least in part on the measurement satisfying the threshold, to reduce power consumption.

Some aspects described herein relate to a method of wireless communication performed by a UE. The method may include transmitting an indication that the UE is configured to use spare SNR to reduce power consumption. The method may include modifying a parameter associated with a modem of the UE based at least in part on the spare SNR satisfying a threshold.

Some aspects described herein relate to a method of wireless communication performed by a network node. The method may include receiving an indication that a UE is configured to use spare SNR to reduce power consumption. The method may include transmitting at least one parameter associated with using the spare SNR to reduce power consumption.

Some aspects described herein relate to a non-transitory computer-readable medium that stores a set of instructions for wireless communication by a UE. The set of instructions, when executed by one or more processors of the UE, may cause the UE to determine that a measurement associated with signal strength satisfies a threshold. The set of instructions, when executed by one or more processors of the UE, may cause the UE to modify a parameter associated with a modem of the UE, based at least in part on the measurement satisfying the threshold, to reduce power consumption.

Some aspects described herein relate to a non-transitory computer-readable medium that stores a set of instructions for wireless communication by a UE. The set of instructions, when executed by one or more processors of the UE, may cause the UE to transmit an indication that the UE is configured to use spare SNR to reduce power consumption. The set of instructions, when executed by one or more processors of the UE, may cause the UE to modify a parameter associated with a modem of the UE based at least in part on the spare SNR satisfying a threshold.

Some aspects described herein relate to a non-transitory computer-readable medium that stores a set of instructions for wireless communication by a network node. The set of instructions, when executed by one or more processors of the network node, may cause the network node to receive an indication that a UE is configured to use spare SNR to reduce power consumption. The set of instructions, when executed by one or more processors of the network node, may cause the network node to transmit at least one parameter associated with using the spare SNR to reduce power consumption.

Some aspects described herein relate to an apparatus for wireless communication. The apparatus may include means for determining that a measurement associated with signal strength satisfies a threshold. The apparatus may include means for modifying a parameter associated with a modem of the apparatus, based at least in part on the measurement satisfying the threshold, to reduce power consumption.

Some aspects described herein relate to an apparatus for wireless communication. The apparatus may include means for transmitting an indication that the apparatus is configured to use spare SNR to reduce power consumption. The apparatus may include means for modifying a parameter associated with a modem of the apparatus based at least in part on the spare SNR satisfying a threshold.

Some aspects described herein relate to an apparatus for wireless communication. The apparatus may include means for receiving an indication that a UE is configured to use spare SNR to reduce power consumption. The apparatus may include means for transmitting at least one parameter associated with using the spare SNR to reduce power consumption.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
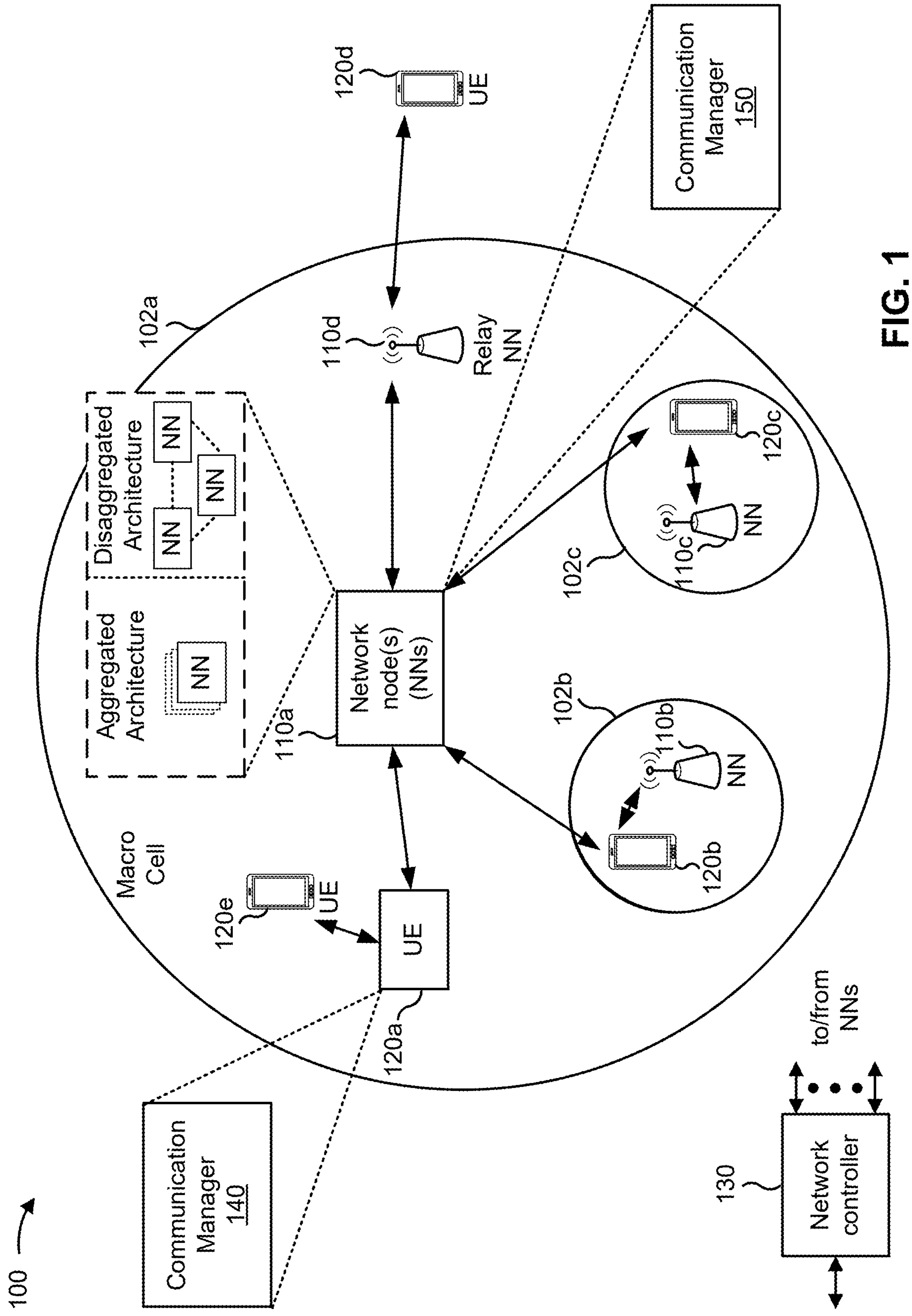
FIG. 1 is a diagram illustrating an example of a wireless network, in accordance with the present disclosure.

User equipment (UE) often rely on battery power or another limited source of power (e.g., a fuel cell) to operate. Many operations consume power, particularly on receive (Rx) chain of the UE. For example, channel estimation and decoding both consume processing resources and power on the Rx chain. However, techniques to reduce power consumption often result in latency (e.g., from less accurate channel estimation and/or decoding). Additionally, some techniques to reduce power consumption can backfire by resulting in more retransmissions, caused by less accurate channel estimation and/or decoding, which actually increases power consumption.

Various aspects relate generally to wireless communication and more particularly to using instantaneously high signal strength (e.g., using spare signal-to-noise ratio (SNR)) to reduce power consumption at a modem of a UE. For example, a change in conditions may reduce beam blocking and/or otherwise result in an abrupt increase in signal strength, either across the entire system bandwidth for a duration of time or for only one (or a few) sub-carriers, out of a plurality of sub-carriers, for a duration of time. The instantaneous boost in signal strength may result in improved communication between a network and the UE and may be detectable as spare SNR (e.g., increased SNR above an SNR requirement) and/or as an increase in another type of measurement. Some aspects more specifically relate to modifying a parameter, associated with the modem, based at least in part on (e.g., in response to) a measurement associated with signal strength satisfying a threshold. For example, the UE may calculate the measurement as a difference between an instantaneous SNR and an SNR requirement. When the measurement satisfies the threshold, the UE may reduce (or remove) a filter associated with channel estimation, refrain from applying a near maximum-likelihood (ML) demodulator, apply a minimum mean square error (MMSE) demodulator to decode, and/or reduce a number of bits per log-likelihood ratio (LLR). The UE may perform the modification on its own. Alternatively, the UE may coordinate with a network to perform the modification so that the network may account for the modification in order to reduce an impact to accuracy of channel estimation and/or decoding (e.g., by modifying a modulation and coding scheme (MCS), among other examples). For example, the UE may transmit an indication that the UE is configured to use spare SNR to reduce power consumption in a capability message and/or a request message. Therefore, the network may transmit a command to use the spare SNR to reduce power consumption and/or may indicate an updated MCS to use.

Particular aspects of the subject matter described in this disclosure can be implemented to realize one or more of the following potential advantages. In some examples, by modifying the parameter associated with the modem, the described techniques can be used to conserve power and processing resources at the UE. More specifically, reducing (or removing) a filter associated with channel estimation reduces processing cycles when receiving a reference signal and/or a demodulation reference signal (DMRS). Similarly, refraining from applying a near ML demodulator (and/or applying an MMSE demodulator to decode) reduces processing and memory overhead when decoding a communication from the network. Reducing a number of bits per LLR is another technique for reducing processing cycles and memory overhead when decoding a communication from the network. In some aspects, the network may coordinate with the UE in order to reduce an impact to accuracy of channel estimation and/or decoding, which further increases power savings by reducing chances of retransmissions.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100. The wireless network 100 may be or may include elements of a 5G (for example, NR) network or a 4G (for example, Long Term Evolution (LTE)) network, among other examples. The wireless network 100 may include one or more network nodes 110 (shown as a network node 110*a*, a network node 110*b*, a network node 110*c*, and a network node 110*d*), a UE 120 or multiple UEs 120 (shown as a UE 120*a*, a UE 120*b*, a UE 120*c*, a UE 120*d*, and a UE 120*c*), or other entities. A network node 110 is an example of a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single RAN node (for example, within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (for example, in 4G), a gNB (for example, in 5G), an access point, or a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 or a network node subsystem serving this coverage area, depending on the context in which the term is used. A network node 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (for example, a home) and may allow restricted access by UEs 120 having association with the femto cell (for example, UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110*a* may be a macro network node for a macro cell 102*a*, the network node 110*b* may be a pico network node for a pico cell 102*b*, and the network node 110*c* may be a femto network node for a femto cell 102*c*. A network node may support one or multiple (for example, three) cells. In some examples, a cell may not necessarily be stationary, and the geographic area of the cell may move according to the location of a network node 110 that is mobile (for example, a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (for example, a network node 110 or a UE 120) and send a transmission of the data to a downstream node (for example, a UE 120 or a network node 110). A relay station may be a UE 120 that can relay transmissions for other UEs 120. In the example shown in FIG. 1, the network node 110*d* (for example, a relay network node) may communicate with the network node 110*a* (for example, a macro network node) and the UE 120*d* in order to facilitate communication between the network node 110*a* and the UE 120*d*. A network node 110 that relays communications may be referred to as a relay station, a relay base station, a relay network node, a relay node, or a relay, among other examples.

The wireless network 100 may be a heterogeneous network that includes network nodes 110 of different types, such as macro network nodes, pico network nodes, femto network nodes, or relay network nodes. These different types of network nodes 110 may have different transmit power levels, different coverage areas, or different impacts on interference in the wireless network 100. For example, macro network nodes may have a high transmit power level (for example, 5 to 40 watts) whereas pico network nodes, femto network nodes, and relay network nodes may have lower transmit power levels (for example, 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, or a subscriber unit. A UE 120 may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, smart jewelry (for example, a smart ring or a smart bracelet)), an entertainment device (for example, a music device, a video device, or a satellite radio), a vehicular component or sensor, a smart meter/sensor, industrial manufacturing equipment, a global positioning system device, a UE function of a network node, or any other suitable device that is configured to communicate via a wireless or wired medium.

Some UEs 120 may be considered machine-type communication (MTC) or evolved or enhanced machine-type communication (eMTC) UEs. An MTC UE or an eMTC UE may include, for example, a robot, a drone, a remote device, a sensor, a meter, a monitor, or a location tag, that may communicate with a network node, another device (for example, a remote device), or some other entity. Some UEs 120 may be considered Internet-of-Things (IoT) devices, or may be implemented as NB-IoT (narrowband IoT) devices. Some UEs 120 may be considered a Customer Premises Equipment. A UE 120 may be included inside a housing that houses components of the UE 120, such as processor components or memory components. In some examples, the processor components and the memory components may be coupled together. For example, the processor components (for example, one or more processors) and the memory components (for example, a memory) may be operatively coupled, communicatively coupled, electronically coupled, or electrically coupled.

In general, any number of wireless networks 100 may be deployed in a given geographic area. Each wireless network 100 may support a particular RAT and may operate on one or more frequencies. A RAT may be referred to as a radio technology or an air interface. A frequency may be referred to as a carrier or a frequency channel. Each frequency may support a single RAT in a given geographic area in order to avoid interference between wireless networks of different RATs. In some cases, NR or 5G RAT networks may be deployed.

In some examples, two or more UEs 120 (for example, shown as UE 120*a* and UE 120*c*) may communicate directly using one or more sidelink channels (for example, without using a network node 110 as an intermediary to communicate with one another). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, or a vehicle-to-pedestrian (V2P) protocol), or a mesh network. In such examples, a UE 120 may perform scheduling operations, resource selection operations, or other operations described elsewhere herein as being performed by the network node 110.

Devices of the wireless network 100 may communicate using the electromagnetic spectrum, which may be subdivided by frequency or wavelength into various classes, bands, or channels. For example, devices of the wireless network 100 may communicate using one or more operating bands. In 5G NR, two initial operating bands have been identified as frequency range designations FR1 (410 MHZ-7.125 GHz) and FR2 (24.25 GHZ-52.6 GHZ). Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHZ-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics or FR2 characteristics, and thus may effectively extend features of FR1 or FR2 into mid-band frequencies. In addition, higher frequency bands are currently being explored to extend 5G NR operation beyond 52.6 GHZ. For example, three higher operating bands have been identified as frequency range designations FR4a or FR4-1 (52.6 GHZ-71 GHZ), FR4 (52.6 GHZ-114.25 GHZ), and FR5 (114.25 GHZ-300 GHZ). Each of these higher frequency bands falls within the EHF band.

With these examples in mind, unless specifically stated otherwise, the term "sub-6 GHZ," if used herein, may broadly represent frequencies that may be less than 6 GHz, may be within FR1, or may include mid-band frequencies. Further, unless specifically stated otherwise, the term "millimeter wave," if used herein, may broadly represent frequencies that may include mid-band frequencies, may be within FR2, FR4, FR4-a or FR4-1, or FR5, or may be within the EHF band. It is contemplated that the frequencies included in these operating bands (for example, FR1, FR2, FR3, FR4, FR4-a, FR4-1, or FR5) may be modified, and techniques described herein are applicable to those modified frequency ranges.

In some aspects, the UE 120 may include a communication manager 140. As described in more detail elsewhere herein, the communication manager 140 may determine that a measurement associated with signal strength satisfies a threshold and may modify a parameter associated with a modem of the UE 120, based at least in part on the measurement satisfying the threshold, to reduce power consumption. Additionally, or alternatively, the communication manager 140 may transmit an indication that the UE 120 is configured to use spare SNR to reduce power consumption and may modify a parameter associated with a modem of the UE 120 based at least in part on the spare SNR satisfying a threshold. Additionally, or alternatively, the communication manager 140 may perform one or more other operations described herein.

In some aspects, the network node 110 may include a communication manager 150. As described in more detail elsewhere herein, the communication manager 150 may receive an indication that a UE 120 is configured to use spare SNR to reduce power consumption and may transmit at least one parameter associated with using the spare SNR to reduce power consumption. Additionally, or alternatively, the communication manager 150 may perform one or more other operations described herein.

As indicated above, FIG. 1 is provided as an example. Other examples may differ from what is described with regard to FIG. 1.

Figure 2:
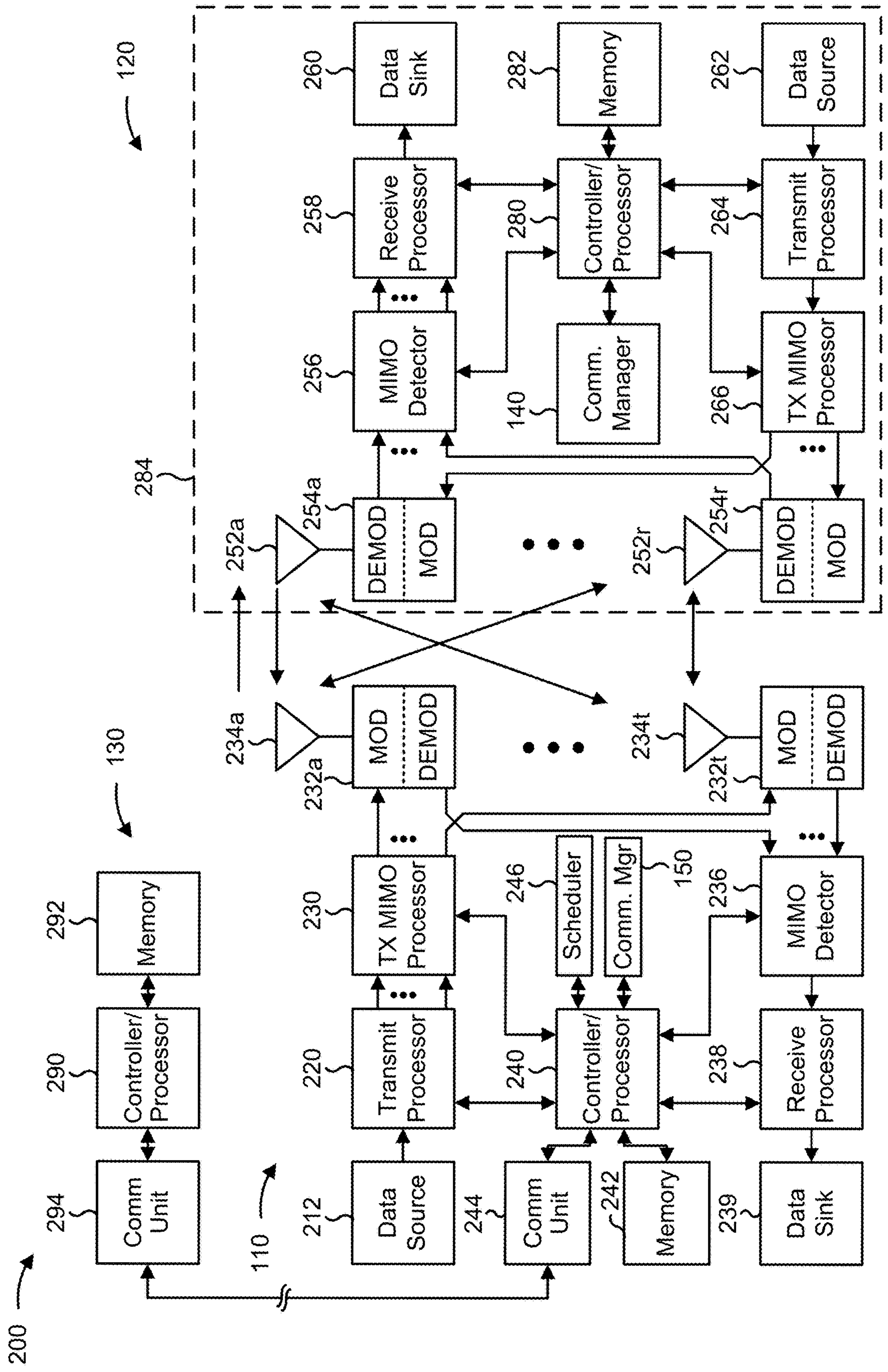
FIG. 2 is a diagram illustrating an example of a network node in communication with a user equipment in a wireless network, in accordance with the present disclosure.

FIG. 2 is a diagram illustrating an example 200 of a network node 110 in communication with a UE 120 in a wireless network 100. The network node 110 may be equipped with a set of antennas 234*a* through 234*t*, such as T antennas (T≥1). The UE 120 may be equipped with a set of antennas 252*a* through 252*r*, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more MCSs for the UE 120 using one or more channel quality indicators (CQIs) received from that UE 120. The network node 110 may process (for example, encode and modulate) the data for the UE 120 using the MCS(s) selected for the UE 120 and may provide data symbols for the UE 120. The transmit processor 220 may process system information (for example, for semi-static resource partitioning information (SRPI)) and control information (for example, CQI requests, grants, or upper layer signaling) and provide overhead symbols and control symbols. The transmit processor 220 may generate reference symbols for reference signals (for example, a cell-specific reference signal (CRS) or a DMRS) and synchronization signals (for example, a primary synchronization signal (PSS) or a secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide a set of output symbol streams (for example, T output symbol streams) to a corresponding set of modems 232 (for example, T modems), shown as modems 232*a* through 232*t*. For example, each output symbol stream may be provided to a modulator component (shown as MOD) of a modem 232. Each modem 232 may use a respective modulator component to process a respective output symbol stream (for example, for OFDM) to obtain an output sample stream. Each modem 232 may further use a respective modulator component to process (for example, convert to analog, amplify, filter, or upconvert) the output sample stream to obtain a downlink signal. The modems 232*a* through 232*t* may transmit a set of downlink signals (for example, T downlink signals) via a corresponding set of antennas 234 (for example, T antennas), shown as antennas 234*a* through 234*t*.

At the UE 120, a set of antennas 252 (shown as antennas 252*a* through 252*r*) may receive the downlink signals from the network node 110 or other network nodes 110 and may provide a set of received signals (for example, R received signals) to a set of modems 254 (for example, R modems), shown as modems 254*a* through 254*r*. For example, each received signal may be provided to a demodulator component (shown as DEMOD) of a modem 254. Each modem 254 may use a respective demodulator component to condition (for example, filter, amplify, downconvert, or digitize) a received signal to obtain input samples. Each modem 254 may use a demodulator component to further process the input samples (for example, for OFDM) to obtain received symbols. A MIMO detector 256 may obtain received symbols from the modems 254, may perform MIMO detection on the received symbols if applicable, and may provide detected symbols. A receive processor 258 may process (for example, demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (for example, antennas 234*a* through 234*t* or antennas 252*a* through 252*r*) may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled to one or more transmission or reception components, such as one or more components of FIG. 2.

On the uplink, at the UE 120, a transmit processor 264 may receive and process data from a data source 262 and control information (for example, for reports that include RSRP, RSSI, RSRQ, or CQI) from the controller/processor 280. The transmit processor 264 may generate reference symbols for one or more reference signals. The symbols from the transmit processor 264 may be precoded by a TX MIMO processor 266 if applicable, further processed by the modems 254 (for example, for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, or the TX MIMO processor 266. The transceiver may be used by a processor (for example, the controller/processor 280) and the memory 282 to perform aspects of any of the processes described herein (e.g., with reference to FIGS. 4-10).

At the network node 110, the uplink signals from UE 120 or other UEs may be received by the antennas 234, processed by the modem 232 (for example, a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, or the TX MIMO processor 230. The transceiver may be used by a processor (for example, the controller/processor 240) and the memory 242 to perform aspects of any of the processes described herein (e.g., with reference to FIGS. 4-10).

In some aspects, the controller/processor 280 may be a component of a processing system. A processing system may generally be a system or a series of machines or components that receives inputs and processes the inputs to produce a set of outputs (which may be passed to other systems or components of, for example, the UE 120). For example, a processing system of the UE 120 may be a system that includes the various other components or subcomponents of the UE 120.

The processing system of the UE 120 may interface with one or more other components of the UE 120, may process information received from one or more other components (such as inputs or signals), or may output information to one or more other components. For example, a chip or modem of the UE 120 may include a processing system, a first interface to receive or obtain information, and a second interface to output, transmit, or provide information. In some examples, the first interface may be an interface between the processing system of the chip or modem and a receiver, such that the UE 120 may receive information or signal inputs, and the information may be passed to the processing system. In some examples, the second interface may be an interface between the processing system of the chip or modem and a transmitter, such that the UE 120 may transmit information output from the chip or modem. A person having ordinary skill in the art will readily recognize that the second interface also may obtain or receive information or signal inputs, and the first interface also may output, transmit, or provide information.

In some aspects, the controller/processor 240 may be a component of a processing system. A processing system may generally be a system or a series of machines or components that receives inputs and processes the inputs to produce a set of outputs (which may be passed to other systems or components of, for example, the network node 110). For example, a processing system of the network node 110 may be a system that includes the various other components or subcomponents of the network node 110.

The processing system of the network node 110 may interface with one or more other components of the network node 110, may process information received from one or more other components (such as inputs or signals), or may output information to one or more other components. For example, a chip or modem of the network node 110 may include a processing system, a first interface to receive or obtain information, and a second interface to output, transmit, or provide information. In some examples, the first interface may be an interface between the processing system of the chip or modem and a receiver, such that the network node 110 may receive information or signal inputs, and the information may be passed to the processing system. In some examples, the second interface may be an interface between the processing system of the chip or modem and a transmitter, such that the network node 110 may transmit information output from the chip or modem. A person having ordinary skill in the art will readily recognize that the second interface also may obtain or receive information or signal inputs, and the first interface also may output, transmit, or provide information.

The controller/processor 240 of the network node 110, the controller/processor 280 of the UE 120, or any other component(s) of FIG. 2 may perform one or more techniques associated with reducing power consumption in UE modems, as described in more detail elsewhere herein. For example, the controller/processor 240 of the network node 110, the controller/processor 280 of the UE 120, or any other component(s) (or combinations of components) of FIG. 2 may perform or direct operations of, for example, process 600 of FIG. 6, process 700 of FIG. 7, process 800 of FIG. 8, and/or other processes as described herein. The memory 242 and the memory 282 may store data and program codes for the network node 110 and the UE 120, respectively. In some examples, the memory 242 and the memory 282 may include a non-transitory computer-readable medium storing one or more instructions (for example, code or program code) for wireless communication. For example, the one or more instructions, when executed (for example, directly, or after compiling, converting, or interpreting) by one or more processors of the network node 110 or the UE 120, may cause the one or more processors, the UE 120, or the network node 110 to perform or direct operations of, for example, process 600 of FIG. 6, process 700 of FIG. 7, process 800 of FIG. 8, and/or other processes as described herein. In some examples, executing instructions may include running the instructions, converting the instructions, compiling the instructions, and/or interpreting the instructions, among other examples.

In some aspects, a UE (e.g., the UE 120 and/or apparatus 900 of FIG. 9) may include means for determining that a measurement associated with signal strength satisfies a threshold and/or means for modifying a parameter associated with a modem of the UE, based at least in part on the measurement satisfying the threshold, to reduce power consumption. Additionally, or alternatively, the UE may include means for transmitting an indication that the UE is configured to use spare SNR to reduce power consumption and/or means for modifying a parameter associated with a modem of the UE based at least in part on the spare SNR satisfying a threshold. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

Figure 9:
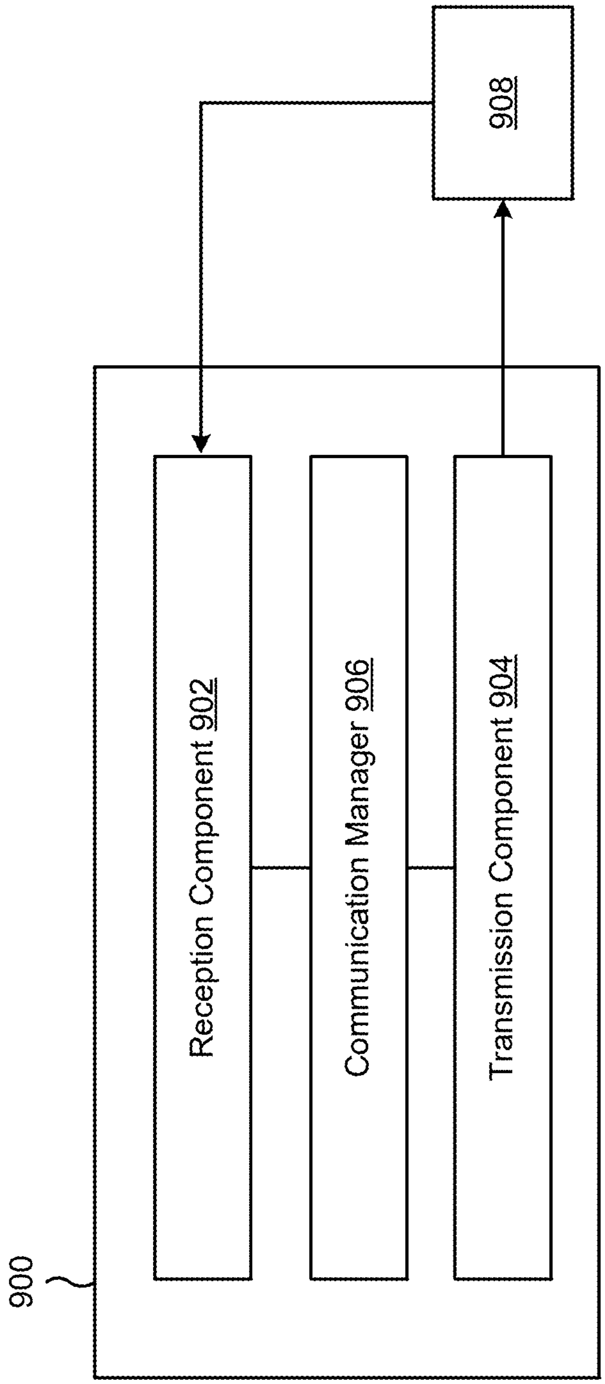
FIGS. 9 and 10 are diagrams of example apparatuses for wireless communication, in accordance with the present disclosure.
Figure 10:
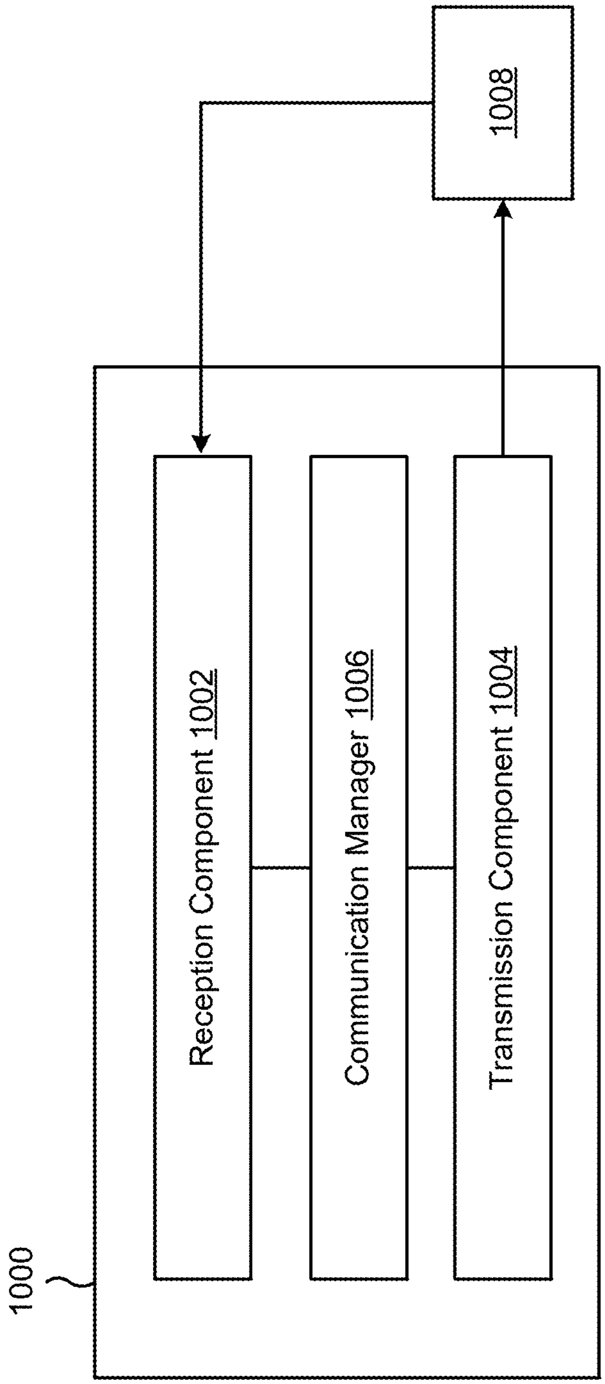

In some aspects, a network node (e.g., the network node 110, an RU, a DU, a CU, and/or apparatus 1000 of FIG. 10) includes means for receiving an indication that a UE (e.g., the UE 120 and/or apparatus 900 of FIG. 9) is configured to use spare SNR to reduce power consumption; and/or means for transmitting at least one parameter associated with using the spare SNR to reduce power consumption. The means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (for example, within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
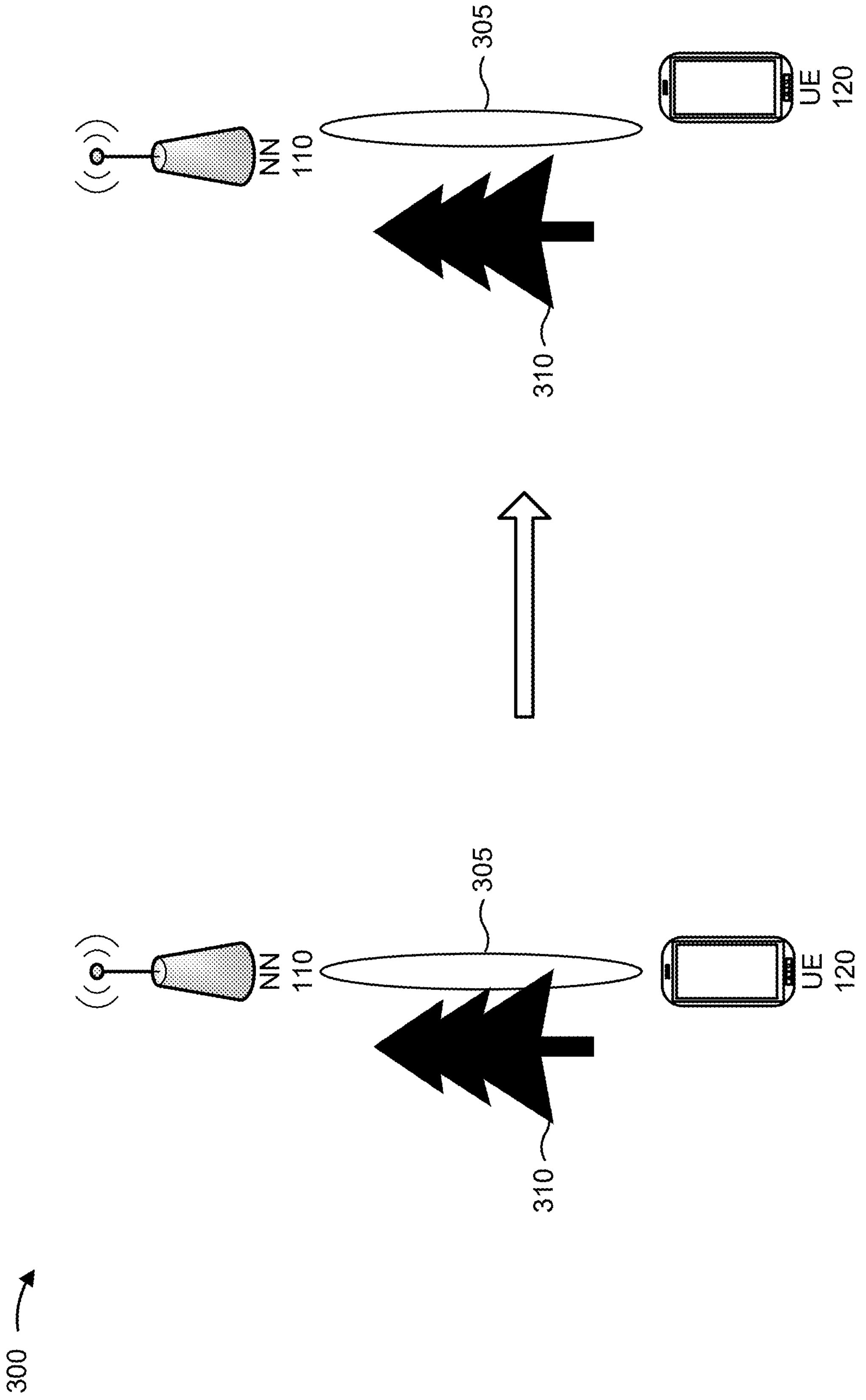
FIG. 3 is a diagram illustrating an example of instantaneous signal-to-noise ratio, in accordance with the present disclosure.

FIG. 3 is a diagram illustrating an example 300 of instantaneous SNR, in accordance with the present disclosure. As shown in FIG. 3, a network node 110 and a UE 120 may communicate with one another via one or more beams 305, which may include an uplink beam and a downlink beam (which may collectively referred to as a beam pair). As further shown, a signal strength associated with the beam 305 may be affected by multiple environmental factors, such as wind, atmospheric temperature and pressure, and/or nearby objects (e.g., tree 310) that interrupt a propagation path of the beam 305, among other examples. In example 300, organic matter in the form of the tree 310 is shown as blocking the path of the beam 305. However, other types of obstructions (e.g., inorganic matter) may additionally or alternatively block the beam 305 in other environments or scenarios.

As further shown in FIG. 3, a change in conditions may reduce beam blocking and/or otherwise result in an abrupt increase in the signal strength associated with the beam 305 (and/or one or more adjacent beams in a beam set that includes the beam 305). This instantaneous boost in signal strength may occur across the entire system bandwidth on the beam 305 for a duration of time or may occur for only one (or a few) sub-carriers, out of a plurality of sub-carriers associated with the beam 305, for a duration of time. An instantaneous boost in signal strength may result in improved communication between the network node 110 and the UE 120, such as improved channel conditions that result in better reception, improved channel conditions that result in more accurate demodulation, and/or more accurate decoding at the UE 120. The instantaneous boost in signal strength may be detectable as spare SNR (e.g., increased SNR above an SNR requirement) and/or as an increase in another type of measurement.

As described herein, a UE (e.g., the UE 120) may use an instantaneously high signal strength (e.g., spare SNR) to reduce power consumption at a modem of the UE 120. For example, the UE 120 may modify a parameter, associated with the modem, based at least in part on (e.g., in response to) a measurement associated with signal strength satisfying a threshold. As a result, the UE 120 conserves power and processing resources.

In some aspects, the UE 120 may coordinate with a network (e.g., with a network node 110) to perform the modification so that the network node 110 may account for the modification in order to reduce an impact to accuracy of channel estimation and/or decoding (e.g., by modifying an MCS, among other examples). For example, the UE 120 may transmit an indication that the UE 120 is configured to use spare SNR to reduce power consumption in a capability message and/or a request message. Therefore, the network node 110 may transmit a command to use the spare SNR to reduce power consumption and/or may indicate an updated MCS to use. As a result, the network node 110 may reduce an impact, caused by the modification, to accuracy of channel estimation and/or decoding, which further increases power savings by reducing chances of retransmissions.

As indicated above, FIG. 3 is provided merely as an example. Other examples may differ from what is described with regard to FIG. 3.

Figure 4:
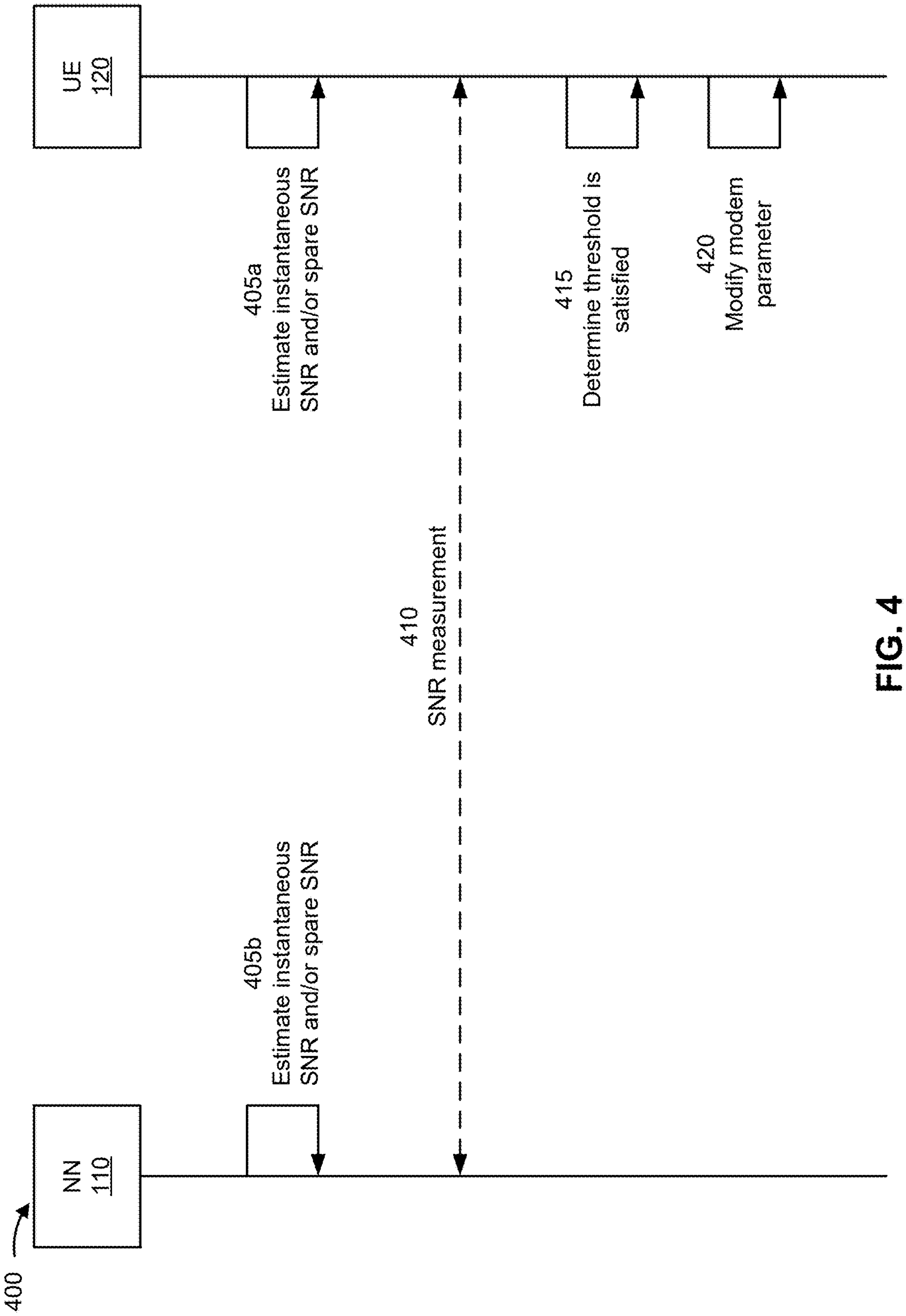
FIGS. 4 and 5 are diagrams illustrating examples associated with using spare signal strength to reduce power consumption, in accordance with the present disclosure.

FIG. 4 is a diagram illustrating an example 400 associated with using spare signal strength to reduce power consumption, in accordance with the present disclosure. As shown in FIG. 4, a network node 110 and a UE 120 may communicate with one another (e.g., on a wireless network, such as wireless network 100 of FIG. 1). In some aspects, network node 110 may include an RU that communicates with the UE 120 and/or a device controlling the RU, such as a DU and/or a CU.

As shown by reference number 405*a*, the UE 120 may estimate an instantaneous SNR and/or a spare SNR. For example, the UE 120 may estimate the instantaneous SNR and/or the spare SNR associated with the UE 120 (e.g., associated with a channel between the UE 120 and a network including the network node 110). In some aspects, the UE 120 may calculate the instantaneous SNR using a reference signal from the network node 110 (e.g., directly or via an RU), such as a tracking reference signal (TRS), a synchronization signal block (SSB), and/or a channel state information (CSI) reference signal (CSI-RS), among other examples. Additionally, or alternatively, the UE 120 may calculate the instantaneous SNR using a DMRS included in a communication from the network node 110 (e.g., directly or via an RU). For example, the network node 110 may transmit a physical downlink shared channel (PDSCH) communication that includes at least one DMRS symbol, and the UE 120 may use the at least one DMRS symbol to calculate the instantaneous SNR. For example, the UE 120 may determine a correlation with a DMRS pattern inlayed in the received signal and calculate the instantaneous SNR from the correlation.

The instantaneous SNR may be associated with a frequency band (or subband) used by the network node 110 and the UE 120. Alternatively, the instantaneous SNR may be associated with a subcarrier, out of a plurality of subcarriers, used by the network node 110 and the UE 120. A "subcarrier" may refer to a frequency based at least in part on a "carrier" frequency. Because each subcarrier may be regarded as a small bandwidth signal, orthogonal to remaining subcarriers, each subcarrier may experience an approximately flat fading channel. Because channel fading changes in time, there may be time intervals of low fading, resulting in a high instantaneous SNR for a specific subcarrier. As described herein, the UE 120 may use a high instantaneous SNR to conserve power.

In some aspects, the UE 120 may transmit an indication of the instantaneous SNR to the network (e.g., via the network node 110), as described in connection with reference number 410, for calculation of the spare SNR. Alternatively, the UE 120 may estimate the spare SNR at the UE 120. The UE 120 may calculate the spare SNR using the instantaneous SNR estimated at the UE 120 or using an instantaneous SNR received from the network (e.g., via the network node 110), as described in connection with reference number 410.

The UE 120 may calculate the spare SNR by subtracting an SNR requirement from the instantaneous SNR. For example, the UE 120 may execute the following example equation:

$$SNR_{margin} = SNR_{post\_process} - SNR_{required},$$

where $SNR_{margin}$ represents the spare SNR, $SNR_{post\_process}$ represents the instantaneous SNR, and $SNR_{required}$ represents the SNR requirement. Because the instantaneous SNR depends on the channel between the network node 110 and the UE 120, an MCS used, an allocation size, and/or another transmission property associated with the network node 110 and the UE 120, the spare SNR may be a function of the same properties.

The SNR requirement may be determined by the UE 120 (and optionally indicated to the network node 110, for example, when the network node 110 estimates the spare SNR) or determined by the network node 110 (and optionally indicated to the UE 120, for example, when the UE 120 estimates the spare SNR). The SNR requirement may be based at least in part on a desired block error rate (BLER) or another measurement associated with quality and/or reliability of communications between the network node 110 and the UE 120. Therefore, the SNR requirement may represent a minimum SNR value in order to preserve quality and/or reliability of communications between the network node 110 and the UE 120.

Although described in connection with SNR, the UE 120 may additionally or alternatively estimate another instantaneous measurement and/or another spare measurement associated with signal strength (e.g., between the UE 120 and the network including the network node 110). For example, the UE 120 may estimate a signal-to-interference-and-noise ratio (SINR), a CQI, an RSRP, an RSSI, and/or an RSRQ, among other examples.

Additionally, or alternatively, as shown by reference number 405*b*, the network node 110 (e.g., directly or via the RU) may estimate an instantaneous SNR and/or a spare SNR associated with the UE 120. For example, the network node 110 may estimate the instantaneous SNR using a reference signal from the UE 120, such as a sounding reference signal (SRS), among other examples. Additionally, or alternatively, the network node 110 may assume reciprocity and calculate the instantaneous SNR using a DMRS included in a communication from the UE 120. For example, the UE 120 may transmit a physical uplink shared channel (PUSCH) communication that includes at least one DMRS symbol, and the network node 110 may use the at least one DMRS symbol to calculate the instantaneous SNR. In some aspects, the network node 110 may adjust the instantaneous SNR downward (e.g., to account for better noise estimation at the UE 120 as compared with assuming reciprocity at the network node 110).

As described above, the instantaneous SNR may be associated with a frequency band (or subband) used by the network node 110 and the UE 120. Alternatively, the instantaneous SNR may be associated with a subcarrier, out of a plurality of subcarriers, used by the network node 110 and the UE 120.

In some aspects, the network node 110 may transmit (e.g., directly or via the RU) an indication of the instantaneous SNR to the UE 120, as described in connection with reference number 410, for calculation of the spare SNR. Alternatively, the network node 110 may estimate the spare SNR at the network node 110. The network node 110 may calculate the spare SNR using the instantaneous SNR estimated at the network node 110 or using an instantaneous SNR received from the UE 120, as described in connection with reference number 410.

The network node 110 may calculate the spare SNR by subtracting an SNR requirement from the instantaneous SNR. For example, the network node 110 may execute the following example equation:

$$SNR_{margin} = SNR_{post\_process} - SNR_{required} - \Delta,$$

where $SNR_{margin}$ represents the spare SNR, $SNR_{post\_process}$ represents the instantaneous SNR. $SNR_{required}$ represents the SNR requirement, and Δ represents an additional noise factor (e.g., for adjusting the instantaneous SNR downward, as described above). Because the instantaneous SNR depends on the channel between the network node 110 and the UE 120, an MCS used, an allocation size, and/or another transmission property associated with the network node 110 and the UE 120, the spare SNR may be a function of the same properties.

As described above, the SNR requirement may be determined by the UE 120 (and optionally indicated to the network node 110, for example, when the network node 110 estimates the spare SNR) or determined by the network node 110 (and optionally indicated to the UE 120, for example, when the UE 120 estimates the spare SNR). Although described in connection with SNR, the network node 110 may additionally or alternatively estimate another instantaneous measurement and/or another spare measurement associated with signal strength (e.g., between the UE 120 and the network including the network node 110). For example, the network node 110 may estimate an SINR, a CQI, an RSRP, an RSSI, and/or an RSRQ, among other examples.

As shown by reference number 410, one of the UE 120 or the network node 110 may transmit an SNR measurement to the other of the UE 120 or the network node 110. For example, the UE 120 may transmit an indication of the instantaneous SNR such that the network node 110 may estimate the spare SNR. Additionally, in some aspects, the UE 120 may transmit an indication of the SNR requirement for the network node 110 to estimate the spare SNR. Therefore, the network node 110 may indicate the spare SNR to the UE 120 (and/or a command to reduce power consumption based on the spare SNR, as described in connection with FIG. 5). Any measurement described herein may be included in downlink control information (DCI) (or uplink control information (UCI)) or in a medium access control (MAC) control element (MAC-CE).

In another example, the network node 110 may transmit an indication of the instantaneous SNR such that the UE 120 may estimate the spare SNR. Additionally, in some aspects, the network node 110 may transmit an indication of the SNR requirement for the UE 120 to estimate the spare SNR. Therefore, the UE 120 may indicate the spare SNR to the network node 110 (and/or an indication that the UE 120 is going to reduce power consumption based on the spare SNR, as described in connection with FIG. 5).

As shown by reference number 415, the UE 120 may determine that the spare SNR (and/or another measurement associated with signal strength) satisfies a threshold. For example, the UE 120 may execute the following example formula:

$$SNR_{margin} > \text{threshold},$$

where $SNR_{margin}$ represents the spare SNR, and threshold represents the threshold. The threshold may be determined by the UE 120 (and optionally indicated to the network node 110) or determined by the network node 110 (and indicated to the UE 120). The threshold may be based at least in part on a desired power savings for the UE 120. Therefore, the threshold may be smaller when the UE 120 is engaged in more aggressive power savings (e.g., based on a battery capacity, a current battery level, a current thermal level, and/or a current traffic level, among other examples). On the other hand, the threshold may be larger when the UE 120 is engaged in less aggressive power savings.

Based at least in part on the spare SNR satisfying the threshold, the UE 120 may modify a parameter associated with a modem, as shown by reference number 420. In one example, the UE 120 may engage in relaxed channel estimation to conserve power. Relaxed channel estimation may include reducing a filter (e.g., using a shorter filter) or removing a filter altogether to reduce computationally complexity. Additionally, or alternatively, the UE 120 may optimize machine learning estimation (e.g., in a recurrent neural network (RNN) or another type of neural network) for channel estimation. Optimized machine learning estimation may include assuming a fixed model (e.g., a diagonal matrix) to reduce computationally complexity.

Additionally, or alternatively, the UE 120 may refrain from using a near ML demodulator to decode signals from the network node 110. Because near ML demodulation is more computationally complex, other techniques conserve power at the UE 120. For example, the UE 120 may apply an MMSE demodulator instead. Additionally, or alternatively, the UE 120 may reduce a number of bits per LLR (e.g., using power gating or even using a single bit such that hard decoding is applied). Reducing bits per LLR reduces processor cycles in decoding and thus conserves power.

For example, the LLR may follow the example equation below:

$$|LLR| = \ln\left(\frac{P(\text{correct})}{P(\text{error})}\right) = \ln\left(\frac{P(\text{correct})}{1 - P(\text{correct})}\right) \rightarrow P(\text{correct}) = \frac{1}{1 + e^{-|LLR|}},$$

where P(correct) represents the probability of a correct decoding, and P(error) represents the probability of an incorrect decoding. Therefore, the UE 120 may determine a minimum information (MI) according to the example equation below:

$$MI = 1 - H(P(\text{correct})) = 1 + [P(\text{correct}) \cdot \log_2(P(\text{correct})) + (1 - P(\text{correct})) \cdot \log_2(1 - P(\text{correct}))],$$

where H represents the Fox H-function. When the UE 120 receives information from the network that is greater than the MI, the UE 120 may reduce a number of bits per LLR (or even apply hard decoding) without loss of decoding accuracy. For example, MI may be 0.3 such that a coding rate above 0.3, caused by spare SNR that satisfies the threshold, allows the UE 120 to conserve power in decoding without increasing retransmissions.

Additionally, or alternatively, other parameters may be modified. For example, the UE 120 may apply a spatial receive filter that consumes less power at an antenna array of the UE 120. In another example, the UE 120 may refrain from measuring a reference signal (e.g., a CSI-RS) and/or refrain from transmitting a report (e.g., a CSI report) to the network node 110.

The UE 120 (and/or then network node 110, as described above) may continue to monitor instantaneous SNR (and thus spare SNR). Therefore, the UE 120 may continue to use the modified parameter until an updated instantaneous SNR results in an updated spare SNR that no longer satisfies the threshold. In some aspects, the UE 120 may apply hysteresis such that the UE 120 may modify the threshold (e.g., downward) after the parameter is modified. As a result, the UE 120 will continue to use the modified parameter even if the spare SNR undergoes a temporary drop.

By using techniques as described in connection with FIG. 4, the UE 120 modifies the parameter, associated with the modem, in response to the spare SNR satisfying the threshold. As a result, the UE 120 conserves power and processing resources. The instantaneous SNR may be calculated at the UE 120 to increase accuracy or may be calculated at the network node 110 to conserve power at the UE 120. Similarly, the spare SNR may be calculated at the UE 120 to decrease latency between calculation of the spare SNR and modification of the parameter or may be calculated at the network node 110 to conserve power at the UE 120.

As indicated above, FIG. 4 is provided as an example. Other examples may differ from what is described with respect to FIG. 4.

Figure 5:
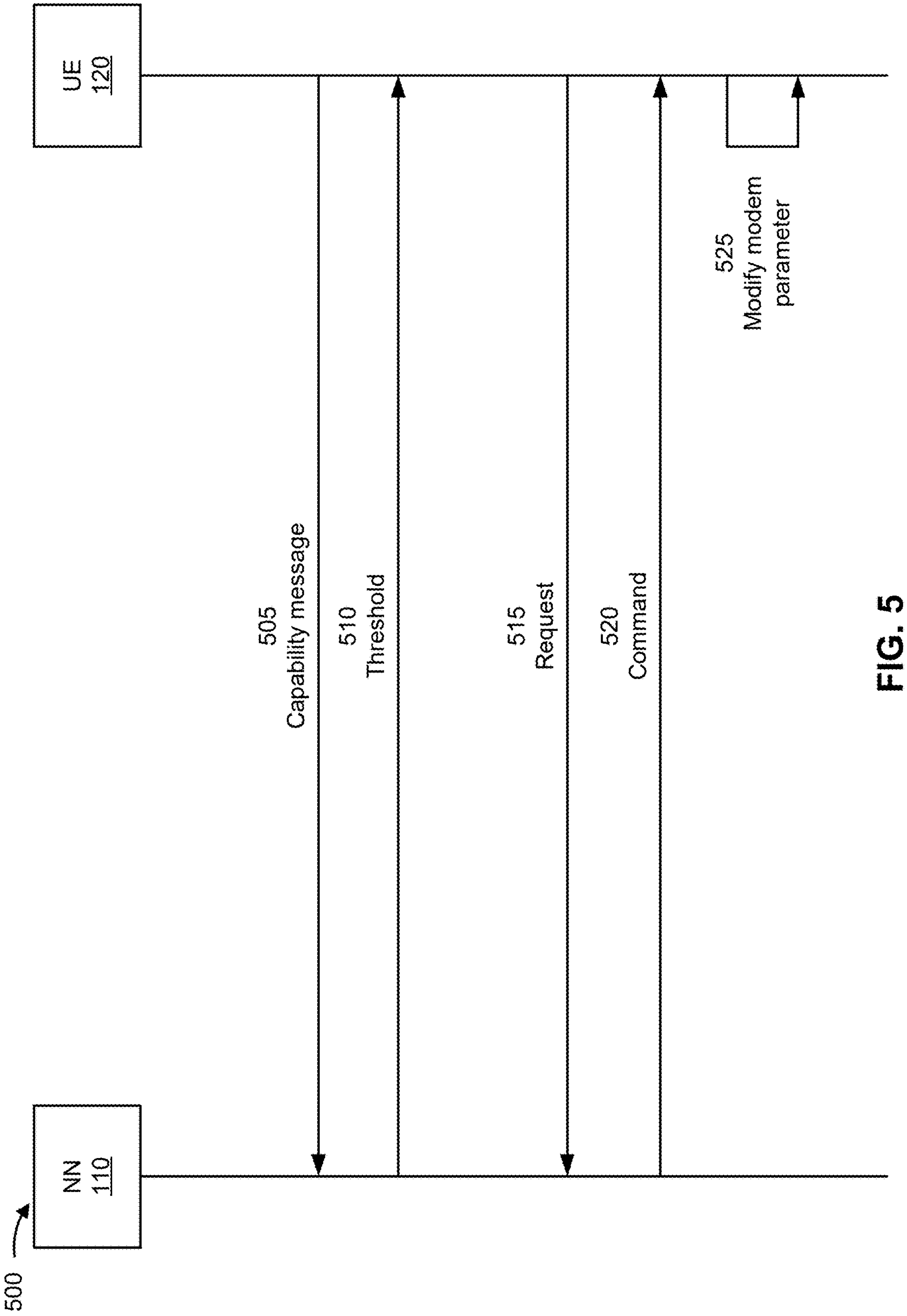

FIG. 5 is a diagram illustrating an example 500 associated with using spare signal strength to reduce power consumption, in accordance with the present disclosure. As shown in FIG. 4, a network node 110 and a UE 120 may communicate with one another (e.g., on a wireless network, such as wireless network 100 of FIG. 1). In some aspects, network node 110 may include an RU that communicates with the UE 120 and/or a device controlling the RU, such as a DU and/or a CU.

As shown by reference number 505, the UE 120 may transmit, and the network node 110 may receive (e.g., directly or via an RU), a capability message. For example, the capability message may include a UECapabilityInformation information element (IE), as defined in 3GPP specifications. The capability message may include an indication that the UE 120 is configured to use spare SNR to reduce power consumption. For example, the capability message may include a Boolean (or another type of bit) that is set to TRUE (or '1') to indicate that the UE 120 is configured to use spare SNR to reduce power consumption.

In some aspects, the UE 120 may further indicate a threshold that the UE 120 will use to reduce power consumption (e.g., as described in connection with reference number 415 of FIG. 4). The UE 120 may indicate the threshold directly or using an index that corresponds to a table (or another set) of possible thresholds (e.g., to be defined in 3GPP specifications and/or another standard). For example, the table may include four different possible thresholds such that the UE 120 may indicate a selected threshold using two bits. Other examples may include fewer possible thresholds or additional possible thresholds.

In some aspects, and as shown by reference number 510, the network node 110 may transmit (e.g., directly or via the RU), and the UE 120 may receive, an indication of a threshold to use to reduce power consumption. For example, the threshold may be in decibels (dB) or another similar unit of measurement. The network node 110 may indicate the threshold directly or using an index that corresponds to a table (or another set) of possible thresholds (e.g., to be defined in 3GPP specifications and/or another standard), as described above. In aspects where the network node 110 indicates the threshold to use, a threshold indicated by the UE 120 in the capability message may function as a suggested threshold (or a requested threshold).

Additionally, or alternatively, the UE 120 and the network node 110 may exchange messages when the UE 120 detects (e.g., directly or from an indication by the network node 110) that the spare SNR satisfies the threshold. For example, as shown by reference number 515, the UE 120 may transmit, and the network node 110 may receive (e.g., directly or via an RU), a request. The request may be included in DCI or in a MAC-CE. The request may include an indication that the UE 120 desires to use spare SNR to reduce power consumption. For example, the request may include a Boolean (or another type of bit) that is set to TRUE (or '1') to indicate that the UE 120 is requesting permission to use spare SNR to reduce power consumption.

As shown by reference number 520, the network node 110 may transmit (e.g., directly or via the RU), and the UE 120 may receive, a command to use the spare SNR to reduce power consumption. The command may be in response to the request. Additionally, or alternatively, the network node 110 may transmit an indication of an updated MCS to use (e.g., to account for the UE 120 using the spare SNR to reduce power consumption).

Accordingly, as shown by reference number 525, the UE 120 may modify a parameter associated with a modem based at least in part on the spare SNR satisfying the threshold. The UE 120 may modify the parameter as described in connection with reference number 420 of FIG. 4.

By using techniques as described in connection with FIG. 5, the UE 120 may coordinates with the network node 110 to perform the modification. As a result, the network node 110 may instruct the UE 120 to refrain from power saving (or to use a larger threshold) when the network node 110 detects increased retransmissions, which reduces power waste at the network node 110 and at the UE 120. Additionally, or alternatively, the network node 110 may account for the modification in order to reduce an impact to accuracy of channel estimation and/or decoding (e.g., by modifying an MCS, among other examples).

As indicated above, FIG. 5 is provided as an example. Other examples may differ from what is described with respect to FIG. 5.

Figure 6:
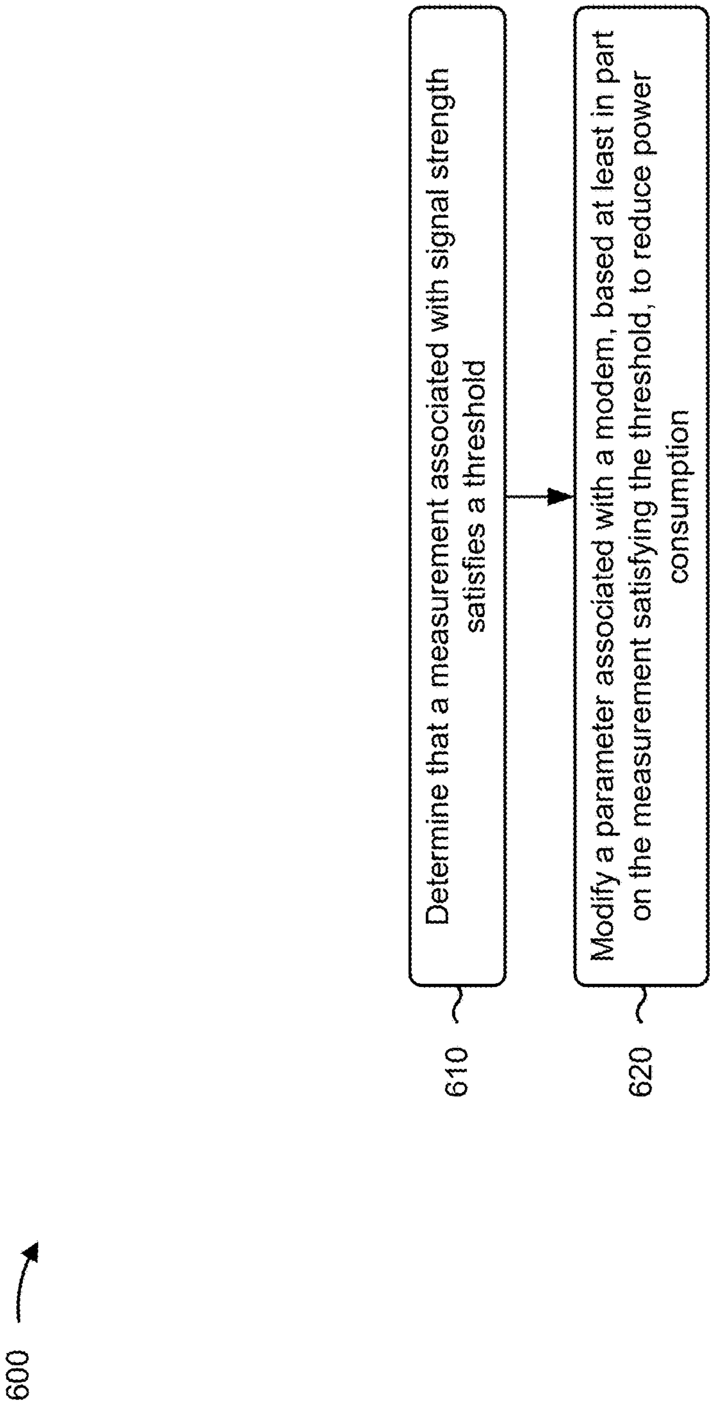
FIGS. 6, 7, and 8 are diagrams illustrating example processes associated with using spare signal strength to reduce power consumption, in accordance with the present disclosure.

FIG. 6 is a diagram illustrating an example process 600 performed, for example, by a UE, in accordance with the present disclosure. Example process 600 is an example where the UE (e.g., UE 120 and/or apparatus 900 of FIG. 9) performs operations associated with using spare signal strength to reduce power consumption.

As shown in FIG. 6, in some aspects, process 600 may include determining that a measurement associated with signal strength satisfies a threshold (block 610). For example, the UE (e.g., using communication manager 906, depicted in FIG. 9) may determine that a measurement associated with signal strength satisfies a threshold, as described herein.

As further shown in FIG. 6, in some aspects, process 600 may include modifying a parameter associated with a modem, based at least in part on the measurement satisfying the threshold, to reduce power consumption (block 620). For example, the UE (e.g., using communication manager 906) may modify a parameter associated with a modem, based at least in part on the measurement satisfying the threshold, to reduce power consumption, as described herein.

Process 600 may include additional aspects, such as any single aspect or any combination of aspects described below and/or in connection with one or more other processes described elsewhere herein.

In a first aspect, the measurement associated with signal strength includes an SNR.

In a second aspect, alone or in combination with the first aspect, the measurement associated with signal strength includes a spare SNR calculated as a difference between an instantaneous SNR and an SNR requirement.

In a third aspect, alone or in combination with one or more of the first and second aspects, the measurement associated with signal strength is further associated with a sub-carrier from a plurality of sub-carriers.

In a fourth aspect, alone or in combination with one or more of the first through third aspects, modifying the parameter associated with the modem includes reducing, or removing, a filter associated with channel estimation.

In a fifth aspect, alone or in combination with one or more of the first through fourth aspects, modifying the parameter associated with the modem includes applying an MMSE demodulator to decode.

In a sixth aspect, alone or in combination with one or more of the first through fifth aspects, modifying the parameter associated with the modem includes refraining from applying a near ML demodulator.

In a seventh aspect, alone or in combination with one or more of the first through sixth aspects, modifying the parameter associated with the modem includes reducing a number of bits per LLR.

In an eighth aspect, alone or in combination with one or more of the first through seventh aspects, determining that the measurement satisfies the threshold includes estimating an instantaneous SNR using a reference signal and subtracting an SNR requirement from the instantaneous SNR to calculate the measurement.

In a ninth aspect, alone or in combination with one or more of the first through eighth aspects, determining that the measurement satisfies the threshold includes estimating an instantaneous SNR using a DMRS and subtracting an SNR requirement from the instantaneous SNR to calculate the measurement.

In a tenth aspect, alone or in combination with one or more of the first through ninth aspects, determining that the measurement satisfies the threshold includes receiving, from a network, an indication of an instantaneous SNR, and subtracting an SNR requirement from the instantaneous SNR to calculate the measurement.

In an eleventh aspect, alone or in combination with one or more of the first through tenth aspects, determining that the measurement satisfies the threshold includes transmitting, to a network, an indication of an instantaneous SNR, and receiving, from the network, an indication of the measurement in response to the indication of the instantaneous SNR.

In a twelfth aspect, alone or in combination with one or more of the first through eleventh aspects, determining that the measurement satisfies the threshold includes receiving, from a network, an indication of the measurement.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
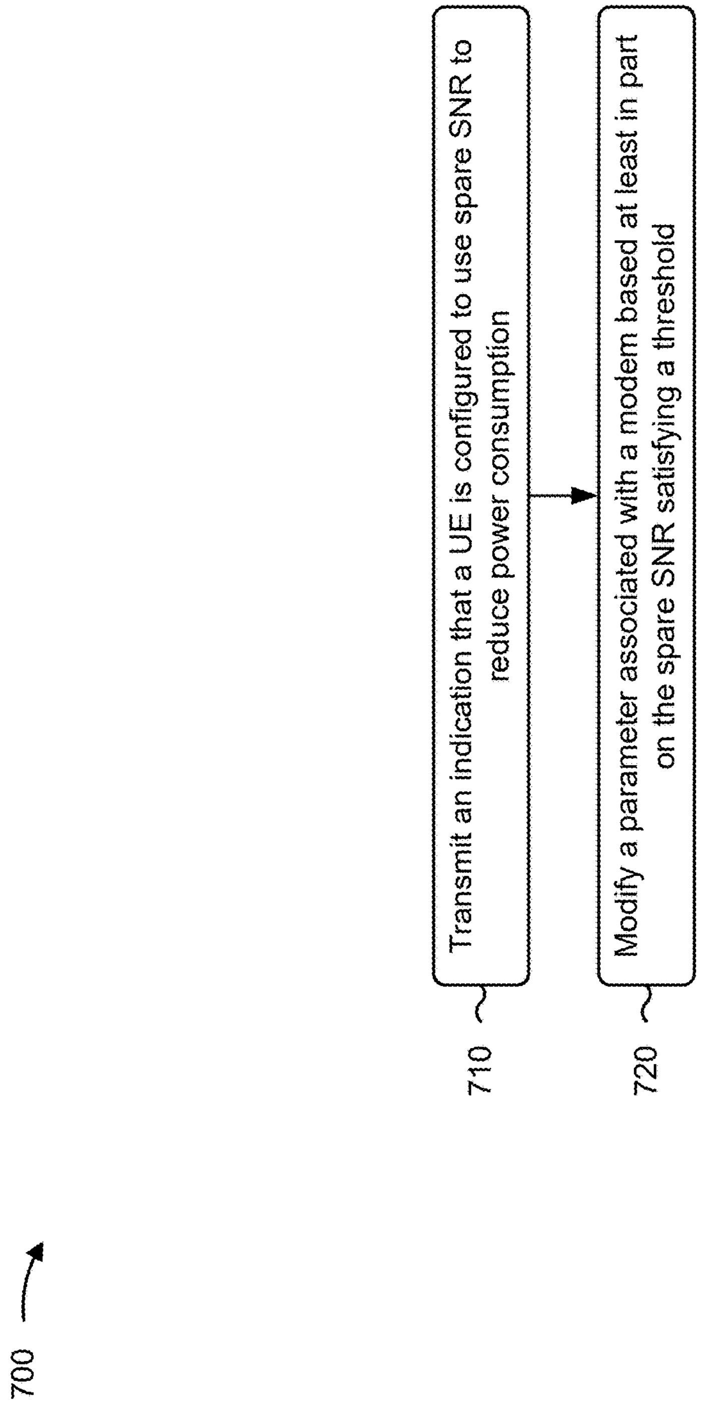

FIG. 7 is a diagram illustrating an example process 700 performed, for example, by a UE, in accordance with the present disclosure. Example process 700 is an example where the UE (e.g., UE 120 and/or apparatus 900 of FIG. 9) performs operations associated with using spare signal strength to reduce power consumption.

As shown in FIG. 7, in some aspects, process 700 may include transmitting an indication that a UE is configured to use spare SNR to reduce power consumption (block 710). For example, the UE (e.g., using transmission component 904 and/or communication manager 906, depicted in FIG. 9) may transmit an indication that the UE is configured to use spare SNR to reduce power consumption, as described herein.

As further shown in FIG. 7, in some aspects, process 700 may include modifying a parameter associated with a modem based at least in part on the spare SNR satisfying a threshold (block 720). For example, the UE (e.g., using communication manager 906, depicted in FIG. 9) may modify a parameter associated with a modem based at least in part on the spare SNR satisfying a threshold, as described herein.

Process 700 may include additional aspects, such as any single aspect or any combination of aspects described below and/or in connection with one or more other processes described elsewhere herein.

In a first aspect, the spare SNR is calculated as a difference between an instantaneous SNR and an SNR requirement.

In a second aspect, alone or in combination with the first aspect, the spare SNR is associated with a sub-carrier from a plurality of sub-carriers.

In a third aspect, alone or in combination with one or more of the first and second aspects, the indication is included in a capability message.

In a fourth aspect, alone or in combination with one or more of the first through third aspects, the capability message indicates the threshold.

In a fifth aspect, alone or in combination with one or more of the first through fourth aspects, the indication is included in a request message.

In a sixth aspect, alone or in combination with one or more of the first through fifth aspects, process 700 includes receiving (e.g., using reception component 902 and/or communication manager 906, depicted in FIG. 9) a command to use the spare SNR to reduce power consumption.

In a seventh aspect, alone or in combination with one or more of the first through sixth aspects, process 700 includes receiving (e.g., using reception component 902 and/or communication manager 906) an indication of an updated MCS in response to the request message.

In an eighth aspect, alone or in combination with one or more of the first through seventh aspects, modifying the parameter associated with the modem includes reducing, or removing, a filter associated with channel estimation.

In a ninth aspect, alone or in combination with one or more of the first through eighth aspects, modifying the parameter associated with the modem includes applying an MMSE demodulator to decode.

In a tenth aspect, alone or in combination with one or more of the first through ninth aspects, modifying the parameter associated with the modem includes refraining from applying a near ML demodulator.

In an eleventh aspect, alone or in combination with one or more of the first through tenth aspects, modifying the parameter associated with the modem includes reducing a number of bits per LLR.

In a twelfth aspect, alone or in combination with one or more of the first through eleventh aspects, process 700 includes estimating (e.g., using reception component 902 and/or communication manager 906) an instantaneous SNR using a reference signal and subtracting (e.g., using communication manager 906) an SNR requirement from the instantaneous SNR to calculate the spare SNR.

In a thirteenth aspect, alone or in combination with one or more of the first through twelfth aspects, process 700 includes estimating (e.g., using reception component 902 and/or communication manager 906) an instantaneous SNR using a DMRS and subtracting (e.g., using communication manager 906) an SNR requirement from the instantaneous SNR to calculate the spare SNR.

In a fourteenth aspect, alone or in combination with one or more of the first through thirteenth aspects, process 700 includes receiving (e.g., using reception component 902 and/or communication manager 906) an indication of an instantaneous SNR and subtracting (e.g., using communication manager 906) an SNR requirement from the instantaneous SNR to calculate the spare SNR.

In a fifteenth aspect, alone or in combination with one or more of the first through fourteenth aspects, process 700 includes transmitting (e.g., using transmission component 904 and/or communication manager 906), to a network, an indication of an instantaneous SNR, and receiving (e.g., using reception component 902 and/or communication manager 906), from the network, an indication of the spare SNR in response to the indication of the instantaneous SNR.

In a sixteenth aspect, alone or in combination with one or more of the first through fifteenth aspects, process 700 includes receiving (e.g., using reception component 902 and/or communication manager 906) an indication of the spare SNR.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
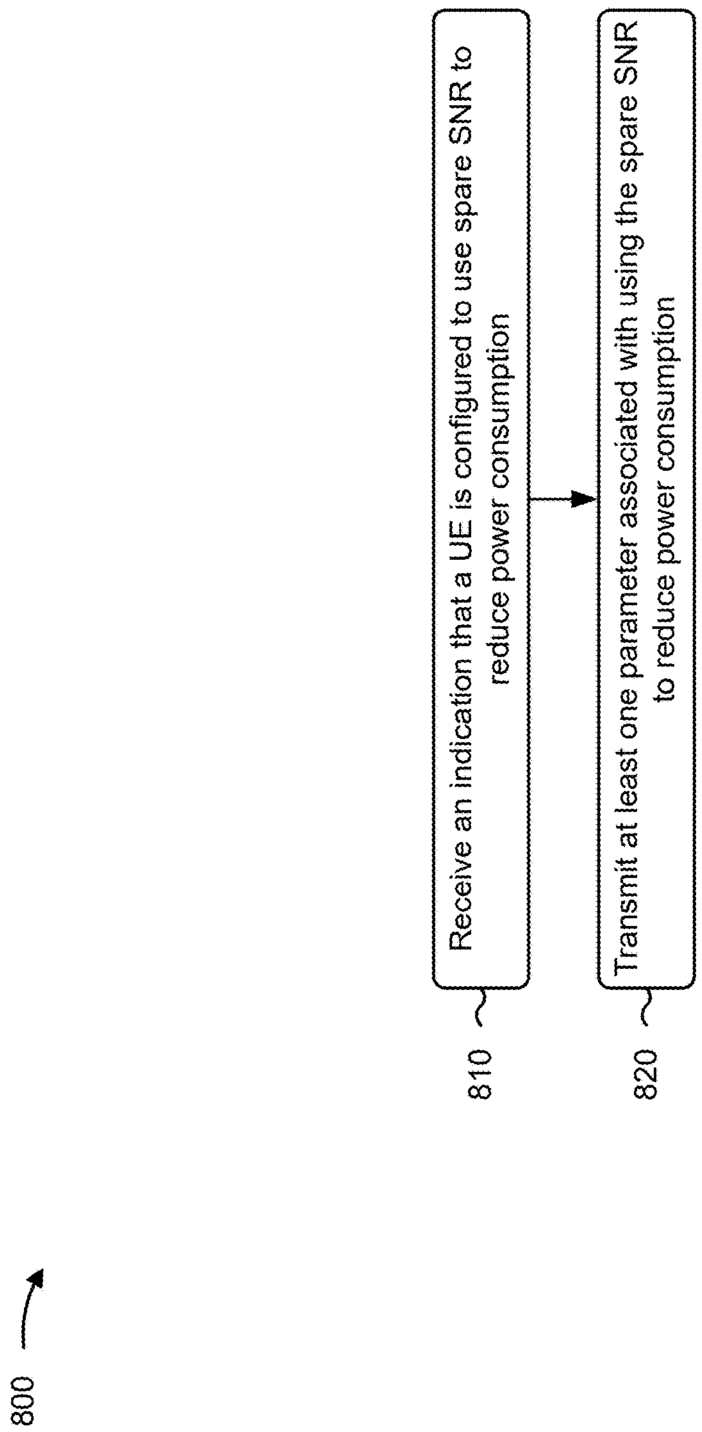

FIG. 8 is a diagram illustrating an example process 800 performed, for example, by a network node, in accordance with the present disclosure. Example process 800 is an example where the network node (e.g., network node 110 and/or apparatus 1000 of FIG. 10) performs operations associated with using spare signal strength to reduce power consumption.

As shown in FIG. 8, in some aspects, process 800 may include receiving an indication that a UE is configured to use spare SNR to reduce power consumption (block 810). For example, the network node (e.g., using reception component 1002 and/or communication manager 1006, depicted in FIG. 10) may receive an indication that a UE is configured to use spare SNR to reduce power consumption, as described herein.

As further shown in FIG. 8, in some aspects, process 800 may include transmitting at least one parameter associated with using the spare SNR to reduce power consumption (block 820). For example, the network node (e.g., using transmission component 1004 and/or communication manager 1006, depicted in FIG. 10) may transmit at least one parameter associated with using the spare SNR to reduce power consumption, as described herein.

Process 800 may include additional aspects, such as any single aspect or any combination of aspects described below and/or in connection with one or more other processes described elsewhere herein.

In a first aspect, the spare SNR is calculated as a difference between an instantaneous SNR and an SNR requirement.

In a second aspect, alone or in combination with the first aspect, the spare SNR is associated with a sub-carrier from a plurality of sub-carriers.

In a third aspect, alone or in combination with one or more of the first and second aspects, the indication is included in a capability message.

In a fourth aspect, alone or in combination with one or more of the first through third aspects, the indication is included in a request message.

In a fifth aspect, alone or in combination with one or more of the first through fourth aspects, transmitting the at least one parameter includes transmitting a command to use the spare SNR to reduce power consumption.

In a sixth aspect, alone or in combination with one or more of the first through fifth aspects, transmitting the at least one parameter includes transmitting an indication of an updated MCS.

In a seventh aspect, alone or in combination with one or more of the first through sixth aspects, process 800 includes transmitting (e.g., using transmission component 1004 and/or communication manager 1006) a reference signal.

In an eighth aspect, alone or in combination with one or more of the first through seventh aspects, process 800 includes transmitting (e.g., using transmission component 1004 and/or communication manager 1006) a communication including a DMRS.

In a ninth aspect, alone or in combination with one or more of the first through eighth aspects, transmitting the at least one parameter includes transmitting an indication of an instantaneous SNR.

In a tenth aspect, alone or in combination with one or more of the first through ninth aspects, process 800 includes receiving (e.g., using reception component 1002 and/or communication manager 1006) an indication of an instantaneous SNR associated with the UE, such that transmitting the at least one parameter includes transmitting an indication of the spare SNR in response to the indication of the instantaneous SNR.

In an eleventh aspect, alone or in combination with one or more of the first through tenth aspects, transmitting the at least one parameter includes transmitting an indication of the spare SNR.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

FIG. 9 is a diagram of an example apparatus 900 for wireless communication, in accordance with the present disclosure. The apparatus 900 may be a UE, or a UE may include the apparatus 900. In some aspects, the apparatus 900 includes a reception component 902, a transmission component 904, and/or a communication manager 906, which may be in communication with one another (for example, via one or more buses and/or one or more other components). In some aspects, the communication manager 906 is the communication manager 140 described in connection with FIG. 1. As shown, the apparatus 900 may communicate with another apparatus 908, such as a UE or a network node (such as a CU, a DU, an RU, or a base station), using the reception component 902 and the transmission component 904.

In some aspects, the apparatus 900 may be configured to perform one or more operations described herein in connection with FIGS. 4-5. Additionally, or alternatively, the apparatus 900 may be configured to perform one or more processes described herein, such as process 600 of FIG. 6, process 700 of FIG. 7, or a combination thereof. In some aspects, the apparatus 900 and/or one or more components shown in FIG. 9 may include one or more components of the UE described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 908. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the UE described in connection with FIG. 2.

The transmission component 904 may transmit communications, such as reference signals, control information, data communications, or a combination thereof, to the apparatus 908. In some aspects, one or more other components of the apparatus 900 may generate communications and may provide the generated communications to the transmission component 904 for transmission to the apparatus 908. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 908. In some aspects, the transmission component 904 may include one or more antennas, a modem, a modulator, a transmit MIMO processor, a transmit processor, a controller/processor, a memory, or a combination thereof, of the UE described in connection with FIG. 2. In some aspects, the transmission component 904 may be co-located with the reception component 902 in a transceiver.

The communication manager 906 may support operations of the reception component 902 and/or the transmission component 904. For example, the communication manager 906 may receive information associated with configuring reception of communications by the reception component 902 and/or transmission of communications by the transmission component 904. Additionally, or alternatively, the communication manager 906 may generate and/or provide control information to the reception component 902 and/or the transmission component 904 to control reception and/or transmission of communications.

In some aspects, the communication manager 906 may determine that a measurement associated with signal strength satisfies a threshold. Accordingly, the communication manager 906 may modify a parameter associated with a modem of the apparatus 900 (e.g., included in the reception component 902), based at least in part on the measurement satisfying the threshold, to reduce power consumption.

Additionally, in some aspects, the transmission component 904 may transmit (e.g., to a network and via the apparatus 908) an indication that the apparatus 900 is configured to use spare SNR to reduce power consumption. Accordingly, the communication manager 906 may modify a parameter associated with a modem of the apparatus 900 (e.g., included in the reception component 902) based at least in part on the spare SNR satisfying a threshold.

In some aspects, the reception component 902 may receive (e.g., from the network and via the apparatus 908) a command to use the spare SNR to reduce power consumption. Additionally, or alternatively, the reception component 902 may receive (e.g., from the network and via the apparatus 908) an indication of an updated MCS.

In some aspects, the communication manager 906 (in coordination with the reception component 902) may estimate an instantaneous SNR using a reference signal and may subtract an SNR requirement from the instantaneous SNR to calculate the spare SNR. Additionally, or alternatively, the communication manager 906 (in coordination with the reception component 902) may estimate an instantaneous SNR using a DMRS and may subtract an SNR requirement from the instantaneous SNR to calculate the spare SNR.

Alternatively, the reception component 902 may receive (e.g., from the network and via the apparatus 908) an indication of an instantaneous SNR associated with the apparatus 900, and the communication manager 906 may subtract an SNR requirement from the instantaneous SNR to calculate the spare SNR. Alternatively, the transmission component 904 may transmit (e.g., to the network and via the apparatus 908) an indication of an instantaneous SNR associated with the apparatus, and the reception component 902 may receive (e.g., from the network and via the apparatus 908) an indication of the spare SNR in response to the indication of the instantaneous SNR. Alternatively, the reception component 902 may receive (e.g., from the network and via the apparatus 908) an indication of the spare SNR.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

FIG. 10 is a diagram of an example apparatus 1000 for wireless communication, in accordance with the present disclosure. The apparatus 1000 may be a network node, or a network node may include the apparatus 1000. In some aspects, the apparatus 1000 includes a reception component 1002, a transmission component 1004, and/or a communication manager 1006, which may be in communication with one another (for example, via one or more buses and/or one or more other components). In some aspects, the communication manager 1006 is the communication manager 150 described in connection with FIG. 1. As shown, the apparatus 1000 may communicate with another apparatus 1008, such as a UE or a network node (such as a CU, a DU, an RU, or a base station), using the reception component 1002 and the transmission component 1004.

In some aspects, the apparatus 1000 may be configured to perform one or more operations described herein in connection with FIGS. 4-5. Additionally, or alternatively, the apparatus 1000 may be configured to perform one or more processes described herein, such as process 800 of FIG. 8, or a combination thereof. In some aspects, the apparatus 1000 and/or one or more components shown in FIG. 10 may include one or more components of the network node described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1008. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the network node described in connection with FIG. 2. In some aspects, the reception component 1002 and/or the transmission component 1004 may include or may be included in a network interface. The network interface may be configured to obtain and/or output signals for the apparatus 1000 via one or more communications links, such as a backhaul link, a midhaul link, and/or a fronthaul link.

The transmission component 1004 may transmit communications, such as reference signals, control information, data communications, or a combination thereof, to the apparatus 1008. In some aspects, one or more other components of the apparatus 1000 may generate communications and may provide the generated communications to the transmission component 1004 for transmission to the apparatus 1008. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1008. In some aspects, the transmission component 1004 may include one or more antennas, a modem, a modulator, a transmit MIMO processor, a transmit processor, a controller/processor, a memory, or a combination thereof, of the network node described in connection with FIG. 2. In some aspects, the transmission component 1004 may be co-located with the reception component 1002 in a transceiver.

The communication manager 1006 may support operations of the reception component 1002 and/or the transmission component 1004. For example, the communication manager 1006 may receive information associated with configuring reception of communications by the reception component 1002 and/or transmission of communications by the transmission component 1004. Additionally, or alternatively, the communication manager 1006 may generate and/or provide control information to the reception component 1002 and/or the transmission component 1004 to control reception and/or transmission of communications.

In some aspects, the reception component 1002 may receive (e.g., from the apparatus 1008, such as a UE) an indication that a UE is configured to use spare SNR to reduce power consumption. Accordingly, the transmission component 1004 may transmit (e.g., to the apparatus 1008, such as the UE) at least one parameter associated with using the spare SNR to reduce power consumption.

In some aspects, the transmission component 1004 may transmit (e.g., to the apparatus 1008) a reference signal and/or a communication including a DMRS. In some aspects, the reception component 1002 may receive (e.g., from the apparatus 1008) an indication of an instantaneous SNR associated with the UE, such that the transmission component 1004 transmits the at least one parameter comprises transmitting an indication of the spare SNR in response to the indication of the instantaneous SNR.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a user equipment (UE), comprising: determining that a measurement associated with signal strength satisfies a threshold; and modifying a parameter associated with a modem of the UE, based at least in part on the measurement satisfying the threshold, to reduce power consumption.

Aspect 2: The method of Aspect 1, wherein the measurement associated with signal strength comprises a signal-to-noise ratio (SNR).

Aspect 3: The method of Aspect 2, wherein the measurement associated with signal strength comprises a spare SNR calculated as a difference between an instantaneous SNR and an SNR requirement.

Aspect 4: The method of any of Aspects 1-3, wherein the measurement associated with signal strength is further associated with a sub-carrier from a plurality of sub-carriers used by the UE.

Aspect 5: The method of any of Aspects 1-4, wherein modifying the parameter associated with the modem comprises: reducing, or removing, a filter associated with channel estimation.

Aspect 6: The method of any of Aspects 1-5, wherein modifying the parameter associated with the modem comprises: applying a minimum mean square error demodulator to decode.

Aspect 7: The method of any of Aspects 1-6, wherein modifying the parameter associated with the modem comprises: refraining from applying a near maximum-likelihood demodulator.

Aspect 8: The method of any of Aspects 1-7, wherein modifying the parameter associated with the modem comprises: reducing a number of bits per log-likelihood ratio.

Aspect 9: The method of any of Aspects 1-8, wherein determining that the measurement satisfies the threshold comprises: estimating an instantaneous SNR using a reference signal; and subtracting an SNR requirement from the instantaneous SNR to calculate the measurement.

Aspect 10: The method of any of Aspects 1-9, wherein determining that the measurement satisfies the threshold comprises: estimating an instantaneous SNR using a demodulation reference signal; and subtracting an SNR requirement from the instantaneous SNR to calculate the measurement.

Aspect 11: The method of any of Aspects 1-10, wherein determining that the measurement satisfies the threshold comprises: transmitting, to a network, an indication of an instantaneous SNR associated with the UE; and receiving, from the network, an indication of the measurement in response to the indication of the instantaneous SNR.

Aspect 12: The method of any of Aspects 1-8, wherein determining that the measurement satisfies the threshold comprises: receiving, from a network, an indication of the measurement.

Aspect 13: The method of any of Aspects 1-8, wherein determining that the measurement satisfies the threshold comprises: receiving, from a network, an indication of an instantaneous SNR associated with the UE; and subtracting an SNR requirement from the instantaneous SNR to calculate the measurement.

Aspect 14: A method of wireless communication performed by a user equipment (UE), comprising: transmitting an indication that the UE is configured to use spare signal-to-noise ratio (SNR) to reduce power consumption; and modifying a parameter associated with a modem of the UE based at least in part on the spare SNR satisfying a threshold.

Aspect 15: The method of Aspect 14, wherein the spare SNR is calculated as a difference between an instantaneous SNR and an SNR requirement.

Aspect 16: The method of any of Aspects 14-15, wherein the spare SNR is associated with a sub-carrier from a plurality of sub-carriers used by the UE.

Aspect 17: The method of any of Aspects 14-16, wherein the indication is included in a capability message.

Aspect 18: The method of Aspect 17, wherein the capability message indicates the threshold.

Aspect 19: The method of any of Aspects 14-18, wherein the indication is included in a request message.

Aspect 20: The method of Aspect 19, further comprising: receiving an indication of an updated modulation and coding scheme in response to the request message.

Aspect 21: The method of any of Aspects 14-20, further comprising: receiving a command to use the spare SNR to reduce power consumption.

Aspect 22: The method of any of Aspects 14-21, wherein modifying the parameter associated with the modem comprises: reducing, or removing, a filter associated with channel estimation.

Aspect 23: The method of any of Aspects 14-22, wherein modifying the parameter associated with the modem comprises: applying a minimum mean square error demodulator to decode.

Aspect 24: The method of any of Aspects 14-23, wherein modifying the parameter associated with the modem comprises: refraining from applying a near maximum-likelihood demodulator.

Aspect 25: The method of any of Aspects 14-24, wherein modifying the parameter associated with the modem comprises: reducing a number of bits per log-likelihood ratio.

Aspect 26: The method of any of Aspects 14-25, further comprising: estimating an instantaneous SNR using a reference signal; and subtracting an SNR requirement from the instantaneous SNR to calculate the spare SNR.

Aspect 27: The method of any of Aspects 14-26, further comprising: estimating an instantaneous SNR using a demodulation reference signal; and subtracting an SNR requirement from the instantaneous SNR to calculate the spare SNR.

Aspect 28: The method of any of Aspects 14-27, further comprising: transmitting, to a network, an indication of an instantaneous SNR associated with the UE; and receiving, from the network, an indication of the spare SNR in response to the indication of the instantaneous SNR.

Aspect 29: The method of any of Aspects 14-25, further comprising: receiving an indication of an instantaneous SNR associated with the UE; and subtracting an SNR requirement from the instantaneous SNR to calculate the spare SNR.

Aspect 30: The method of any of Aspects 14-25, further comprising: receiving an indication of the spare SNR.

Aspect 31: A method of wireless communication performed by a network node, comprising: receiving an indication that a user equipment (UE) is configured to use spare signal-to-noise ratio (SNR) to reduce power consumption; and transmitting at least one parameter associated with using the spare SNR to reduce power consumption.

Aspect 32: The method of Aspect 31, wherein the spare SNR is calculated as a difference between an instantaneous SNR and an SNR requirement.

Aspect 33: The method of any of Aspects 31-32, wherein the spare SNR is associated with a sub-carrier from a plurality of sub-carriers used by the UE.

Aspect 34: The method of any of Aspects 31-33, wherein the indication is included in a capability message.

Aspect 35: The method of any of Aspects 31-34, wherein the indication is included in a request message.

Aspect 36: The method of any of Aspects 31-35, wherein transmitting the at least one parameter comprises: transmitting a command to use the spare SNR to reduce power consumption.

Aspect 37: The method of any of Aspects 31-36, wherein transmitting the at least one parameter comprises: transmitting an indication of an updated modulation and coding scheme.

Aspect 38: The method of any of Aspects 31-37, further comprising: transmitting a reference signal to the UE.

Aspect 39: The method of any of Aspects 31-38, further comprising: transmitting a communication including a demodulation reference signal to the UE.

Aspect 40: The method of any of Aspects 31-39, wherein transmitting the at least one parameter comprises: transmitting an indication of an instantaneous SNR associated with the UE.

Aspect 41: The method of any of Aspects 31-40, wherein transmitting the at least one parameter comprises: transmitting an indication of the spare SNR.

Aspect 42: The method of any of Aspects 31-39, further comprising: receiving an indication of an instantaneous SNR associated with the UE, wherein transmitting the at least one parameter comprises transmitting an indication of the spare SNR in response to the indication of the instantaneous SNR.

Aspect 43: An apparatus for wireless communication at a device, comprising a processor; memory coupled with the processor; and instructions stored in the memory and executable by the processor to cause the apparatus to perform the method of one or more of Aspects 1-42.

Aspect 44: A device for wireless communication, comprising a memory and one or more processors coupled to the memory, the one or more processors configured to perform the method of one or more of Aspects 1-42.

Aspect 45: An apparatus for wireless communication, comprising at least one means for performing the method of one or more of Aspects 1-42.

Aspect 46: A non-transitory computer-readable medium storing code for wireless communication, the code comprising instructions executable by a processor to perform the method of one or more of Aspects 1-42.

Aspect 47: A non-transitory computer-readable medium storing a set of instructions for wireless communication, the set of instructions comprising one or more instructions that, when executed by one or more processors of a device, cause the device to perform the method of one or more of Aspects 1-42.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software. As used herein, the phrase "based on" is intended to be broadly construed to mean "based at least in part on." As used herein, "satisfying a threshold" may, depending on the context, refer to a value being greater than the threshold, greater than or equal to the threshold, less than the threshold, less than or equal to the threshold, equal to the threshold, or not equal to the threshold, among other examples. As used herein, a phrase referring to "at least one of" a list of items refers to any combination of those items, including single members. As an example, "at least one of: a, b, or c" is intended to cover: a, b, c, a+b, a+c, b+c, and a+b+c.

Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (for example, related items, unrelated items, or a combination of related and unrelated items), and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A also may have B). Further, as used herein, the term "or" is intended to be inclusive when used in a series and may be used interchangeably with "and/or," unless explicitly stated otherwise (for example, if used in combination with "either" or "only one of").

The various illustrative logics, logical blocks, modules, circuits and algorithm processes described in connection with the aspects disclosed herein may be implemented as electronic hardware, computer software, or combinations of both. The interchangeability of hardware and software has been described generally, in terms of functionality, and illustrated in the various illustrative components, blocks, modules, circuits and processes described herein. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices, for example, a combination of a DSP and a microprocessor, a plurality of microprocessors, one or more microprocessors in conjunction with a DSP core, or any other such configuration. In some aspects, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Aspects of the subject matter described in this specification also can be implemented as one or more computer programs (such as one or more modules of computer program instructions) encoded on a computer storage media for execution by, or to control the operation of, a data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the media described herein should also be included within the scope of computer-readable media. Additionally, the operations of a method or algorithm may reside as one or any combination or set of codes and instructions on a machine readable medium and computer-readable medium, which may be incorporated into a computer program product.

Various modifications to the aspects described in this disclosure may be readily apparent to those skilled in the art, and the generic principles defined herein may be applied to other aspects without departing from the spirit or scope of this disclosure. Thus, the claims are not intended to be limited to the aspects shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate aspects also can be implemented in combination in a single aspect. Conversely, various features that are described in the context of a single aspect also can be implemented in multiple aspects separately or in any suitable subcombination. Moreover, although features may be described as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the aspects described should not be understood as requiring such separation in all aspects, and it should be understood that the described program components and systems can generally be integrated together in a single software product or packaged into multiple software products. Additionally, other aspects are within the scope of the following claims. In some cases, the actions recited in the claims can be performed in a different order and still achieve desirable results.

What is claimed is:

1. An apparatus for wireless communication at a user equipment (UE), comprising:
- one or more memories; and
- one or more processors, coupled to the one or more memories, configured to:
  - determine that a measurement associated with signal strength satisfies a threshold, the measurement including a spare signal-to-noise ratio (SNR) calculated as a difference between an instantaneous SNR and an SNR requirement; and
  - modify a parameter associated with a modem of the UE, based at least in part on the measurement satisfying the threshold, to reduce power consumption.

2. The apparatus of claim 1, wherein the measurement associated with signal strength is further associated with a sub-carrier from a plurality of sub-carriers used by the UE.

3. The apparatus of claim 1, wherein, to modify the parameter associated with the modem, the one or more processors are configured to: reduce, or remove, a filter associated with channel estimation.

4. The apparatus of claim 1, wherein, to modify the parameter associated with the modem, the one or more processors are configured to: apply a minimum mean square error demodulator to decode.

5. The apparatus of claim 1, wherein, to modify the parameter associated with the modem, the one or more processors are configured to: refrain from applying a near maximum-likelihood demodulator.

6. The apparatus of claim 1, wherein, to modify the parameter associated with the modem, the one or more processors are configured to: reduce a number of bits per log-likelihood ratio.

7. The apparatus of claim 1, wherein, to determine that the measurement satisfies the threshold, the one or more processors are configured to:
estimate the instantaneous SNR using a reference signal; and
subtract the SNR requirement from the instantaneous SNR to calculate the measurement.

8. The apparatus of claim 1, wherein, to determine that the measurement satisfies the threshold, the one or more processors are configured to:
estimate the instantaneous SNR using a demodulation reference signal; and
subtract the SNR requirement from the instantaneous SNR to calculate the measurement.

9. The apparatus of claim 1, wherein, to determine that the measurement satisfies the threshold, the one or more processors are configured to:
receive, from a network, an indication of the instantaneous SNR associated with the UE; and
subtract the SNR requirement from the instantaneous SNR to calculate the measurement.

10. The apparatus of claim 1, wherein, to determine that the measurement satisfies the threshold, the one or more processors are configured to:
transmit, to a network, an indication of the instantaneous SNR associated with the UE; and
receive, from the network, an indication of the measurement in response to the indication of the instantaneous SNR.

11. The apparatus of claim 1, wherein, to determine that the measurement satisfies the threshold, the one or more processors are configured to:
receive, from a network, an indication of the measurement.

12. An apparatus for wireless communication at a user equipment (UE), comprising:
one or more memories; and
one or more processors, coupled to the one or more memories, configured to:
transmit an indication that the UE is configured to use spare signal-to-noise ratio (SNR) to reduce power consumption; and
modify a parameter associated with a modem of the UE based at least in part on the spare SNR satisfying a threshold.

13. The apparatus of claim 12, wherein the indication is included in a capability message.

14. The apparatus of claim 12, wherein the indication is included in a request message.

15. The apparatus of claim 12, wherein the one or more processors are further configured to:
receive a command to use the spare SNR to reduce power consumption.

16. The apparatus of claim 12, wherein the one or more processors are further configured to:
receive an indication of an updated modulation and coding scheme in response to the indication.

17. The apparatus of claim 12, wherein the one or more processors are further configured to:
estimate an instantaneous SNR using a reference signal; and
subtract an SNR requirement from the instantaneous SNR to calculate the spare SNR.

18. The apparatus of claim 12, wherein the one or more processors are further configured to:
estimate an instantaneous SNR using a demodulation reference signal; and
subtract an SNR requirement from the instantaneous SNR to calculate the spare SNR.

19. The apparatus of claim 12, wherein the one or more processors are further configured to:
receive an indication of an instantaneous SNR associated with the UE; and
subtract an SNR requirement from the instantaneous SNR to calculate the spare SNR.

20. The apparatus of claim 12, wherein the one or more processors are further configured to:
transmit, to a network, an indication of an instantaneous SNR associated with the UE; and
receive, from the network, an indication of the spare SNR in response to the indication of the instantaneous SNR.

21. The apparatus of claim 12, wherein the one or more processors are further configured to:
receive an indication of the spare SNR.

22. An apparatus for wireless communication at a network node, comprising:
one or more memories; and
one or more processors, coupled to the one or more memories, configured to:
receive an indication that a user equipment (UE) is configured to use spare signal-to-noise ratio (SNR) to reduce power consumption; and
transmit at least one parameter associated with using the spare SNR to reduce power consumption.

23. The apparatus of claim 22, wherein, to transmit the at least one parameter, the one or more processors are configured to: transmit a command to use the spare SNR to reduce power consumption or an indication of an updated modulation and coding scheme.

24. An apparatus for wireless communication at a user equipment (UE), comprising:
one or more memories; and
one or more processors, coupled to the one or more memories, configured to:
determine that a measurement associated with signal strength satisfies a threshold, wherein, to determine that the measurement satisfies the threshold, the one or more processors are configured to at least one of:
estimate an instantaneous signal-to-noise ratio (SNR) using a reference signal and subtract an SNR requirement from the instantaneous SNR to calculate the measurement; or
receive, from a network, an indication of the instantaneous SNR associated with the UE and subtract the SNR requirement from the instantaneous SNR to calculate the measurement; and
modify a parameter associated with a modem of the UE, based at least in part on the measurement satisfying the threshold, to reduce power consumption.

25. The apparatus of claim 24, wherein, to determine that the measurement satisfies the threshold, the one or more processors are configured to:
estimate the instantaneous SNR using the reference signal; and
subtract the SNR requirement from the instantaneous SNR to calculate the measurement.

26. The apparatus of claim 25, wherein the reference signal comprises a demodulation reference signal.

27. The apparatus of claim 24, wherein, to determine that the measurement satisfies the threshold, the one or more processors are configured to:
receive, from the network, the indication of the instantaneous SNR associated with the UE; and subtract the SNR requirement from the instantaneous SNR to calculate the measurement.

28. The apparatus of claim 24, wherein, to determine that the measurement satisfies the threshold, the one or more processors are further configured to:

transmit, to the network, the indication of the instantaneous SNR associated with the UE; and receive, from the network, the indication of the measurement in response to the indication of the instantaneous SNR.

* * * * *